(12) United States Patent
Kusanose et al.

(10) Patent No.: US 10,179,850 B2
(45) Date of Patent: Jan. 15, 2019

(54) FOAMABLE COMPOSITION, PROCESS FOR PRODUCING THE SAME AND FOAM

(75) Inventors: Yasuhiro Kusanose, Tokyo (JP); Mika Horiuchi, Tokyo (JP); Yoshifumi Araki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/581,952

(22) PCT Filed: Mar. 8, 2011

(86) PCT No.: PCT/JP2011/055362
§ 371 (c)(1),
(2), (4) Date: Aug. 30, 2012

(87) PCT Pub. No.: WO2011/111696
PCT Pub. Date: Sep. 15, 2011

(65) Prior Publication Data
US 2012/0322905 A1 Dec. 20, 2012

(30) Foreign Application Priority Data

Mar. 8, 2010 (JP) .................. 2010-050697

(51) Int. Cl.
| | |
|---|---|
| C08J 9/00 | (2006.01) |
| C08L 23/08 | (2006.01) |
| C08J 9/06 | (2006.01) |
| C08L 53/02 | (2006.01) |
| A43B 1/14 | (2006.01) |
| A43B 13/04 | (2006.01) |

(52) U.S. Cl.
CPC ............ C08L 23/0869 (2013.01); A43B 1/14 (2013.01); A43B 13/04 (2013.01); C08J 9/0042 (2013.01); C08J 9/0066 (2013.01); C08J 9/06 (2013.01); C08L 23/0815 (2013.01); C08L 53/02 (2013.01); *C08J 2201/026* (2013.01); *C08J 2323/08* (2013.01); *C08J 2453/02* (2013.01); *C08L 2203/14* (2013.01); *C08L 2310/00* (2013.01); *C08L 2312/08* (2013.01); *C08L 2666/44* (2013.01)

(58) Field of Classification Search
CPC .................................................. C08J 2309/06
See application file for complete search history.

(56) References Cited

U.S. PATENT DOCUMENTS

| | | | |
|---|---|---|---|
| 3,333,024 A | | 7/1967 | Haefele et al. |
| 4,020,025 A | * | 4/1977 | Zeitler et al. .................... 521/56 |
| 4,020,207 A | * | 4/1977 | Alfter et al. ................... 428/138 |
| 4,151,157 A | * | 4/1979 | Williams et al. ............. 523/213 |
| 4,501,857 A | | 2/1985 | Kishimoto et al. |
| 4,673,714 A | | 6/1987 | Kishimoto et al. |
| 5,348,984 A | * | 9/1994 | Lee ................................. 521/79 |
| 5,804,644 A | * | 9/1998 | Nakafutami et al. ......... 524/572 |
| 6,586,483 B2 | * | 7/2003 | Kolb ....................... C08J 9/0066 521/154 |
| 2002/0143077 A1 | | 10/2002 | Sueda et al. |
| 2003/0013778 A1 | | 1/2003 | Sueda et al. |
| 2005/0119414 A1 | * | 6/2005 | Sasagawa ................. C08F 8/04 525/242 |
| 2005/0234193 A1 | | 10/2005 | Sasagawa et al. |
| 2006/0154998 A1 | * | 7/2006 | Shiba et al. ................... 521/142 |
| 2007/0129454 A1 | * | 6/2007 | Su .......................... C08J 9/0061 521/142 |
| 2007/0251572 A1 | | 11/2007 | Hoya et al. |

(Continued)

FOREIGN PATENT DOCUMENTS

| | | |
|---|---|---|
| CN | 101289519 A | 10/2008 |
| GB | 1020720 A | 2/1966 |

(Continued)

OTHER PUBLICATIONS

Zuo, K.; Blackman, B.R.K.; Williams, J.G.; Steininger, H. "The toughening of nano-modified thermoplastics" in Proceedings of the Annual Meeting of the Adhesion Society, 2009. pp. 114-117.*
Choudhury, Namita Roy De, Prajna P. Dutta, Naba K. (2010). Thermal Analysis of Rubbers and Rubbery Materials. Chapter 4.3.3. pp. 162-164. Smithers Rapra Technology. Online version available at: http://app.knovel.com/hotlink/toc/id:kpTARRM002/thermal-analysis-rubbers.*
Dow Corning "Silane Coupling Agents" 2009.*
Hofmans, J.; Van Beylen, M. Synthesis and development of a dilithium initiator and its use for the preparation of ABA-block copolymers in non-polar medium: the use of pi complexing additives. Polymer 46 (2005) 303-318.*

(Continued)

*Primary Examiner* — Kara B Boyle
*Assistant Examiner* — Christina H Wales
(74) *Attorney, Agent, or Firm* — Morgan, Lewis & Bockius LLP

(57) ABSTRACT

The present invention provides a foam which maintains high hardness while being lightweight and has excellent peel strength and permanent compression set, and a foamable composition used to obtain the aforementioned foam. A foamable composition comprising (A) an olefin-based copolymer; (B) a copolymer that is (B-I) and/or (B-II) described below, (B-I) a vinyl aromatic-based copolymer comprising a vinyl aromatic compound and a conjugated diene, and/or a vinyl aromatic-based copolymer comprising a vinyl aromatic compound and alkylene, (B-II) an ethylene-based copolymer having an unsaturated group; (C) an inorganic filler; (D) an organic silane coupling agent; and (E) a foaming agent; wherein a mass ratio of the component (A) to the component (B), (A/B), is from 5/95 to 100/0; an amount of the component (C) is from 0.5 to 35 mass parts, and an amount of the component (E) is from 0.1 to 20 mass parts, based on 100 mass parts of a total amount of the components (A) and (B); and an amount of the component (D) is from 0.1 to 50 mass parts, based on 100 mass parts of the component (C).

28 Claims, No Drawings

(56) References Cited

U.S. PATENT DOCUMENTS

| | | | |
|---|---|---|---|
| 2008/0161485 A1* | 7/2008 | Suzuki et al. | 524/575 |
| 2009/0030099 A1* | 1/2009 | Chino et al. | 521/139 |
| 2009/0100704 A1* | 4/2009 | Kajihara et al. | 36/28 |
| 2009/0209699 A1* | 8/2009 | Weinreich | B60C 1/0016 524/572 |
| 2009/0249645 A1 | 10/2009 | Kajihara et al. | |
| 2009/0312449 A1 | 12/2009 | Sasaki et al. | |
| 2010/0068452 A1 | 3/2010 | Kusanose et al. | |
| 2010/0087559 A1 | 4/2010 | Kusanose et al. | |
| 2011/0065819 A1* | 3/2011 | Schips | C08J 9/0061 521/59 |
| 2011/0160324 A1 | 6/2011 | Yamada et al. | |
| 2011/0275731 A1 | 11/2011 | Shimizu et al. | |

FOREIGN PATENT DOCUMENTS

| | | | |
|---|---|---|---|
| JP | S42-008704 B | | 4/1967 |
| JP | S43-006636 B | | 3/1968 |
| JP | S63-004841 B | | 3/1968 |
| JP | 61204245 | * | 9/1986 |
| JP | S61-204245 A | | 9/1986 |
| JP | S62-079211 A | | 4/1987 |
| JP | H01-037970 B2 | | 8/1989 |
| JP | H01-053851 B2 | | 11/1989 |
| JP | H02-009041 B2 | | 2/1990 |
| JP | H08-143697 A | | 6/1996 |
| JP | 2000-344924 A | | 12/2000 |
| JP | 2002-302565 A | | 10/2002 |
| JP | 2004-107519 A | | 4/2004 |
| JP | 2004-263098 A | | 9/2004 |
| JP | 2008-308619 A | | 12/2008 |
| JP | 2009-161774 A | | 7/2009 |
| JP | 2010-043160 A | | 2/2010 |
| JP | 2010-043162 A | | 2/2010 |
| KR | 2003009904 A | * | 2/2003 |
| TW | 200303875 A | | 9/2003 |
| TW | 200906863 A | | 2/2009 |
| WO | 20051000958 A1 | | 1/2005 |
| WO | 2006/090687 A1 | | 8/2006 |
| WO | 2006/123670 A1 | | 11/2006 |
| WO | 20071094216 A1 | | 8/2007 |
| WO | WO 2009112549 A1 | * | 9/2009 ............ C08J 9/0061 |
| WO | 2010-024458 A1 | | 3/2010 |
| WO | 2010/073589 A1 | | 7/2010 |

OTHER PUBLICATIONS

Kolthoff, I.M.; Lee, T.S.; Carr, C.W. Determination of Polystyrene in GR-S Rubber. Journal of Polymer Science vol. 1, No. 5 (1946) 429-433.*

Hamley, I. W. 2002. Block Copolymers. Encyclopedia of Polymer Science and Technology. 1.*

Hahn, S. F. 2008. Hydrogenation. Encyclopedia of Polymer Science and Technology.*

"Hydrogenated Styrenic Thermoplastic Elastomer Tuftec" by AsahiKasei. Accessed Jun. 27, 2017 at https://www.akelastomer.com/eng/products/tuftec.html.*

Kolthoff et al., "Determination of Polystyrene in GR-S Rubber," Journal of Polymer Science, 1:429-433 (1946).

Wu, ed., "Organic Silicon and Applications Thereof," 279-280 (1990).

* cited by examiner

FOAMABLE COMPOSITION, PROCESS FOR PRODUCING THE SAME AND FOAM

The present application is a U.S. National Phase Application of International Application No. PCT/JP2011/055362 filed Mar. 8, 2011, which claims the benefit of priority of Japanese Application No. 2010-0506097 filed Mar. 8, 2010, the disclosures of which are incorporated herein by reference in their entireties.

TECHNICAL FIELD

The present invention relates to a foamable composition, a process for producing the same, and a form.

BACKGROUND ART

In recent years, foam materials have been attracting attention in view of achieving lightweight. However, if a composition containing a resin or elastomer is merely foamed, the mechanical strength will decrease, causing problems such as deterioration and deformation after long-term use.

For this reason, such a composition is further crosslinked into a crosslinked foam, thereby finding a wide range of applications as a material that is lightweight and has a high mechanical strength, such as automobile parts, construction application materials, various packaging materials, and daily necessities.

Ethylene-vinyl acetate copolymers (EVA) are known as representative crosslinked foams; however, because EVA has a low melt tension, defoaming easily occurs, preventing the expansion ratio from increasing, resulting in an increased specific gravity. Furthermore, another problem thereof is that the defoaming causes significantly rough skin.

On the other hand, proposals have been also made regarding crosslinked foams using ethylene-α-olefin copolymers.

For example, Patent Document 1 discloses a crosslinked foam obtained by crosslinking and foaming an ethylene-α-olefin copolymer, using an organic peroxide, a crosslinking coagent, and a foaming agent.

Furthermore, Patent Document 2 discloses a crosslinked foam obtained by crosslinking and foaming a composition obtained by adding EVA and/or low density polyethylene to an ethylene-α-olefin copolymer.

Moreover, studies have been conducted on modifying the properties and improving the physical properties of a crosslinked foam by adding a styrene-based block copolymer to an ethylene-based copolymer. Patent Document 3 discloses a crosslinked foam obtained by adding a specific proportion of a styrene-based block copolymer to an ethylene-based copolymer.

However, in the conventionally proposed technique described above, it is difficult to obtain a crosslinked foam having a good balance of various physical properties. For example, in the case of the crosslinked foam disclosed in Patent Document 3, because the ethylene-α-olefin copolymer has a low hardness, when crosslinking is performed at a high expansion ratio, problems such as defoaming and deformation occur. Thus, a lightweight crosslinked foam is not obtained; or, even if a lightweight crosslinked foam is obtained, the mechanical properties and the like of the foam often significantly deteriorate. Accordingly, no methods have conventionally been proposed to prepare a crosslinked foam that is lightweight and has high mechanical properties at the same time.

Patent Document 1: Japanese Patent Laid-Open No. 2000-344924
Patent Document 2: Japanese Patent Laid-Open No. 2002-302565
Patent Document 3: Japanese Patent Laid-Open No. 2004-107519

SUMMARY OF THE INVENTION

Problems to be Solved by the Invention

The present invention has been made in view of the above-described circumstances. An object of the present invention is to provide a foam which maintains high hardness while being lightweight and has excellent peel strength and permanent compression set, and a foamable composition used to obtain the aforementioned foam.

Means for Solving the Problems

The present inventors conducted extensive research to solve the above-mentioned problem; consequently, they found that a specific olefin-based copolymer composition can provide an excellent foam which maintains high hardness while being lightweight and has excellent peel strength and permanent compression set, and thereby accomplished the present invention.

In summary, the present invention is as described below.

[1]
A foamable composition comprising:
(A) an olefin-based copolymer;
(B) a copolymer that is (B-I) and/or (B-II) described below;
　(B-I) a vinyl aromatic-based copolymer comprising a vinyl aromatic compound and a conjugated diene, and/or a vinyl aromatic-based copolymer comprising a vinyl aromatic compound and alkylene
　(B-II) an ethylene-based copolymer having an unsaturated group
(C) an inorganic filler;
(D) an organic silane coupling agent; and
(E) a foaming agent; wherein a mass ratio of the component (A) to the component (B), (A/B), is from 5/95 to 100/0;
　an amount of the component (C) is from 0.5 to 35 mass parts, and an amount of the component (E) is from 0.1 to 20 mass parts, based on 100 mass parts of a total amount of the components (A) and (B); and
　an amount of the component (D) is from 0.1 to 50 mass parts, based on 100 mass parts of the component (C).

[2]
The foamable composition according to [1] above, wherein the component (A) is an ethylene-based copolymer.

[3]
The foamable composition according to [1] or [2] above, wherein the component (B-I) comprises from 5 to 90 mass % of a vinyl aromatic monomer unit and from 5 to 65 mass % of a conjugated diene monomer unit.

[4]
The foamable composition according to any one of claims 1 to 3, wherein the component (B) is a copolymer having a functional group in a molecular chain thereof.

The foamable composition according to any one of [1] to [4] above, wherein the component (C) is an inorganic filler selected from the group consisting of a silica-based inorganic filler, a metal oxide, and a metal hydroxide, and a mean dispersed particle diameter thereof is from 0.01 to 4 μm.

The foamable composition according to any one of [1] to [5] above, wherein the component (D) is an organic silane coupling agent having a group exhibiting affinity for or binding ability to the component (A) and/or the component (B), and further a surface of the component (C).

[7]
The foamable composition according to any one of [1] to [6] above, wherein the component (D) is a polysulfide silane coupling agent.

[8]
The foamable composition according to any one of [1] to [7] above, wherein the vinyl aromatic-based copolymer of the component (B-I) has a tan δ peak within a range of more than 0° C. and 30° C. or less and a tan δ value at 15° C. of 0.4 or more, as determined by dynamic viscoelasticity measurement (1 Hz).

[9]
The foamable composition according to any one of [1] to [7] above, wherein the vinyl aromatic-based copolymer of the component (B-I) has a tan δ peak of 0° C. or less, as determined by dynamic viscoelasticity measurement (1 Hz).

[10]
The foamable composition according to any one of [1] to [9] above, further comprising from 0.1 to 20 mass parts of (F) a crosslinking agent, based on 100 mass parts of the total amount of the components (A) and (B).

[11]
A process for producing a foamable composition, comprising the steps of:
previously melt-kneading, at a first stage, at least
(B) a copolymer that is (B-I) and/or (B-II) described below;
(B-I) a copolymer comprising a vinyl aromatic compound and a conjugated diene, and/or a vinyl aromatic-based copolymer comprising a vinyl aromatic compound and alkylene
(B-II) an ethylene-based copolymer having an unsaturated group
(C) an inorganic filler, and
(D) an organic silane coupling agent,
at a temperature of 120° C. or more to obtain a master batch; and
melt-kneading, at a second stage, the master batch, (A) an olefin-based copolymer, (E) a foaming agent, and/or (F) a crosslinking agent.

[12]
A process for producing a foamable composition comprising the steps of:
previously melt-kneading, at a first stage, at least
(A) an olefin-based copolymer,
(B) a copolymer that is (B-I) and/or (B-II) described below
(B-I) a copolymer comprising a vinyl aromatic compound and a conjugated diene, and/or a vinyl aromatic-based copolymer comprising a vinyl aromatic compound and alkylene
(B-II) an ethylene copolymer having an unsaturated group
(C) an inorganic filler, and
(D) an organic silane coupling agent,
at a temperature of 120° C. or more to obtain a master batch; and
melt-kneading, at a second stage, the master batch, (E) a foaming agent, and as required, (F) a crosslinking agent.

[13]
A foam obtainable by foaming, or crosslinking and foaming the foamable composition according to any one of [1] to [10].

[14]
A foam comprising an olefin-based copolymer composition having a specific gravity of from 0.01 to 0.70 and a hardness (Shore C) of from 15 to 70.

[15]
The foam according to [13] or [14] above, which has a specific gravity of from 0.05 to 0.20, a hardness (Shore C) of from 45 to 60, and a value of peel strength/specific gravity of 18 or more.

[16]
A footwear comprising the foam according to any one of [13] to [15] above.

[17]
A building material comprising the foam according to any one of [13] to [15] above.

[18]
An automobile member comprising the foam according to any one of [13] to [15] above.

Advantageous Effects of the Invention

The present invention can provide a foam which maintains high hardness while being lightweight and has excellent peel strength and permanent compression set, and a foamable composition used to obtain the aforementioned foam.

Modes for Carrying Out the Invention

An embodiment for carrying out the present invention (hereinafter referred to as "present embodiment") will now be described in detail below.

The present invention is not limited to the following description, and may be carried out with various modifications made within the scope of the invention.

[Foamable Composition]

A foamable composition of the present embodiment is a composition prior to foaming performed to obtain a foam. It is to be noted that the foamable composition of the present embodiment may be crosslinked as described later to form a crosslinked foam. Hereinafter, when the term "foam" is used in the specification, it means that it also includes a crosslinked foam.

The foamable composition of the present embodiment is a foamable composition comprising:
(A) an olefin-based copolymer;
(B) a copolymer that is (B-I) and/or (B-II) described below
(B-I) a copolymer comprising a vinyl aromatic compound and a conjugated diene, and/or a vinyl aromatic-based copolymer comprising a vinyl aromatic compound and alkylene, and
(B-II) an ethylene-based copolymer having an unsaturated group;
(C) an inorganic filler;
(D) an organic silane coupling agent; and
(E) a foaming agent.

A mass ratio of the component (A) to the component (B), (A/B), is from 5/95 to 100/0.

The component (C) is contained with an amount of from 0.5 to 35 mass parts, and the component (E) is contained with an amount of from 0.1 to 20 mass parts, based on 100 mass parts of the total amount of the components (A) and (B).

The component (D) is contained with an amount of from 0.1 to 50 mass parts, based on 100 mass parts of the component (C).

In the present specification, the nomenclature of each monomer unit that constitutes a polymer is used in accordance with the nomenclature of a monomer from which the monomer unit is derived.

For example, the term "vinyl aromatic monomer unit" means a constitutional unit of a polymer generated as a result of polymerization of a vinyl aromatic compound monomer, and the structure thereof is a molecular structure in which two carbons of a substituted ethylene group derived from a substituted vinyl group become binding sites.

Moreover, the term "conjugated diene monomer unit" means a constitutional unit of a polymer generated as a result of polymerization of a conjugated diene monomer, and the structure thereof is a molecular structure in which two carbons of olefin derived from the conjugated diene monomer become binding sites.

((A) Olefin-based Copolymer)

The (A) olefin-based copolymer (hereinafter sometimes also described simply as component (A)) that constitutes the foamable composition of the present embodiment is a polymer mainly of α-olefin such as ethylene or propylene. The type of such a polymer is not particularly limited, as long as it may be a copolymer obtainable by polymerizing one or more types of monomers selected from among, for example, ethylene, propylene, 1-butene, isobutylene, and 4-methyl-1-pentene. In particular, a homopolymer such as ethylene, butene, methylpentene, and propylene, an ethylene-propylene copolymer, a propylene block copolymer, and a propylene random copolymer are preferred.

Moreover, the (A) olefin-based copolymer includes hydrogenated products of polymers of conjugated diene monomers such as butadiene or isoprene. It also includes a mixture of polymers having different molecular weights and different compositions from among the aforementioned various types of polymers.

Among these (A) olefin-based copolymers, an ethylene-based copolymer is preferred.

Using such an ethylene-based copolymer as an (A) olefin-based copolymer, excellent crosslinkability can be achieved, when the foamable composition of the present embodiment is crosslinked to form a crosslinked foam.

The ethylene-based copolymer is not particularly limited, and a known ethylene-based copolymer can be used. Examples thereof may include polyethylene (PE), which is an ethylene polymer, ethylene-vinyl acetate copolymers (EVA) obtainable by copolymerization of ethylene and vinyl acetate, ethylene-α-olefin copolymers, which are low-crystallinity random copolymers of ethylene and C3-C10 α-olefins, and block copolymers containing ethylene and α-olefins (for example, multi-block copolymers comprising random blocks containing hard segments of crystalline polyethylene and soft segments of ethylene-octene).

When polyethylene is used as an (A) olefin-based copolymer, the type of the polyethylene is not limited, and any known polyethylene can be used.

Examples thereof may include high density polyethylene, ultra-high molecular weight high density polyethylene, low density polyethylene, linear low density polyethylene, and ultra-low density polyethylene.

An (A) olefin-based copolymer may include a copolymer of three or more compounds, which is obtainable from ethylene, and two or more compounds other than ethylene.

Examples thereof may include copolymers of ethylene and two α-olefins (terpolymers), and copolymers obtainable by crosslinking copolymers of ethylene, α-olefins, and unsaturated carboxylic acids (acrylic acid, methacrylic acid, maleic acid, and the like) with metal ions such as $Na^+$, $K^-$, $Ag^+$, $Cu^{++}$, $Ba^{++}$, $Zn^{++}$, and $Fe^{++}$ (ionomers).

From the viewpoint of the fabricability, peel strength and permanent compression set of the desired foamable composition of the present embodiment, among the aforementioned various polymers, the (A) olefin-based copolymer is preferably an ethylene-α-olefin copolymer of ethylene and α-olefin containing 3 to 10 carbon atoms, more preferably an ethylene-α-olefin copolymer of ethylene and α-olefin containing 3 to 6 carbon atoms, and still more preferably a copolymer mainly of ethylene and propylene or 1-butene containing 3 or 4 carbon atoms.

Specific examples of such a copolymer may include "TAFMER" manufactured by Mitsui Chemicals, Inc., "ENGAGE" manufactured by the Dow Chemical Company, "INFUSE" manufactured by the Dow Chemical Company, and "EXACT" manufactured by ExxonMobil Chemical Company.

Ethylene-α-olefin-based copolymers can be obtainable by known polymerization processes. Examples of polymerization processes may include polymerization in inert solvents such as hexane, heptane, toluene, and xylene, using polymerization catalysts such as Ziegler-Natta catalysts and metallocene catalysts.

The melt flow rate (in accordance with JIS K-7210; 190° C.; load: 2.16 Kg) of the above-described (A) olefin-based copolymer is preferably within a range of from 0.1 to 100 g/10 min.

As a polymerization process of the above-described (A) olefin-based copolymer, any types of conventionally known methods can be applied. Examples thereof may include transition polymerization, radical polymerization, and ionic polymerization.

Moreover, the (A) olefin-based copolymers may be used singly, or taking into consideration functionality and like, they may be used in combinations of two or more. For example, for the purpose of improving adhesiveness, EVA may be used in combination.

((B) Copolymer)

The (B) copolymer that constitutes the foamable composition of the present embodiment is (B-I) a vinyl aromatic-based copolymer and/or (B-II) an ethylene-based copolymer having an unsaturated group.

<(B-I) Vinyl Aromatic-based Copolymer>

The (B-I) vinyl aromatic-based copolymer (hereinafter sometimes also described simply as component (B-1)) is a copolymer containing a vinyl aromatic compound and a conjugated diene, and/or a copolymer containing a vinyl aromatic compound and alkylene. The amount of a vinyl aromatic monomer unit and the amount of a conjugated diene monomer unit, which are contained in the (B-I) vinyl aromatic-based copolymer, are not particularly limited. From the viewpoint of productivity and also from the viewpoint of the defoaming, deformation and the like (molding stability) of a (crosslinked) foam, the specific gravity, hardness, physical properties and impact resilience of the desired (crosslinked) foam can be adjusted, and further, the degrees of desired light resistance and heat resistance can be arbitrarily changed.

When the (B-I) vinyl aromatic copolymer is a copolymer containing a vinyl aromatic compound and a conjugated diene, it may contain another polymerizable monomer as a constitutional unit other than the vinyl aromatic monomer unit and the conjugated diene monomer unit, within a range that does not impair the purpose of the present embodiment.

When the (B-I) vinyl aromatic-based copolymer is a copolymer containing a vinyl aromatic compound and a conjugated diene, it preferably contains from 5 to 90 mass % of a vinyl aromatic monomer unit and from 5 to 65 mass % of a conjugated diene monomer unit. The conjugated diene monomer unit is preferably in the above numerical range by being hydrogenated after copolymerization. For example, when a vinyl aromatic-based copolymer containing 20 mass % of the vinyl aromatic monomer unit and 80 mass % of the conjugated diene monomer unit is selectively hydrogenated such that 60% of the unsaturated bond in the conjugated diene monomer unit is hydrogenated, the resulting vinyl aromatic-based copolymer will have 20 mass % of the vinyl aromatic monomer unit and 32 mass % of the conjugated diene monomer unit (the 32 mass % portion, which accounts for 40% of the 80 mass % of the conjugated diene monomer unit, will remain unhydrogenated) and correspond to the (B-I) vinyl aromatic-based copolymer.

The vinyl aromatic monomer unit that constitutes the (B-I) vinyl aromatic-based copolymer is not particularly limited, and known vinyl aromatic monomer units can be used.

Examples thereof may include styrene, o-methylstyrene, p-methylstyrene, p-tert-butylstyrene, 1,3-dimethylstyrene, α-methylstyrene, divinylbenzene, 1,1-diphenylethylene, vinylnaphthalene, and vinylanthracene. These may be used singly, or in combinations of two or more.

The amount of the vinyl aromatic monomer unit that constitutes the (B-I) vinyl aromatic-based copolymer is preferably 5 mass % or more, from the viewpoint of productivity, and various types of molding stability such as the defoaming, deformation and the like of a foam. From the viewpoint of peel strength, crosslinkability, and specific gravity, it is preferably 90 mass % or less. It is more preferably from 10 to 85 mass %, and still more preferably from 15 to 80 mass %.

The amount of the vinyl aromatic monomer unit can be measured by nuclear magnetic resonance spectral analysis (NMR), as described in Examples later.

When the foam of the present embodiment is produced so that it has moderate flexibility and an excellent balance of peel strength, permanent compression set and impact resilience, the amount of the vinyl aromatic monomer unit contained in the component (B-I) is preferably 35 mass % or less, more preferably 30 mass % or less, and still more preferably 25 mass % or less.

On the other hand, as compared with a foam in which the amount of the vinyl aromatic monomer unit contained in the component (B-I) is 35 mass % or less, when a foam having hardness and shape stability, whose physical properties are not impaired at a high expansion ratio of 5 or more, is intended to be obtained, the amount of the vinyl aromatic monomer unit contained in the (B-I) vinyl aromatic-based copolymer is preferably from 35 to 90 mass %, more preferably from 40 to 85 mass %, and still more preferably from 40 to 80 mass %.

Moreover, the amount of the vinyl aromatic monomer unit contained in a polymer block mainly containing at least one vinyl aromatic series is preferably 40 mass % or more, more preferably 50 mass % or more, and still more preferably 60 mass % or more.

The expansion ratio can be calculated based on the ratio of specific gravities before and after foaming.

The amount of the polymer block mainly containing a vinyl aromatic compound in the (B-I) vinyl aromatic-based copolymer is defined by an equation described below, using the weight of a polymer block mainly containing a vinyl aromatic compound (provided that a vinyl aromatic compound polymer having a mean degree of polymerization of approximately 30 or less is excluded), which has been determined by a method of subjecting a copolymer prior to hydrogenation to oxidative decomposition with tertiary butyl hydroperoxide, using osmium tetroxide as a catalyst (the method described in I. M. KOLTHOFF, et al., J. Polym. Sci. 1, 429 (1946); hereinafter also referred to as an "osmium tetroxide method").

The amount (mass %) of polymer block mainly containing vinyl aromatic compound=(weight of polymer block mainly containing vinyl aromatic compound in vinyl aromatic-based copolymer prior to hydrogenation/weight of vinyl aromatic-based copolymer prior to hydrogenation)×100

The phrase "mainly contain" means that the content is 60 mass % or more, preferably 80 mass % or more, more preferably 90 mass % or more, and still more preferably 95 mass % or more.

When a copolymer containing a vinyl aromatic compound and a conjugated diene is used as the (B-I) vinyl aromatic-based copolymer, the conjugated diene contained in the component (B-I) is not particularly limited, and any known substances can be used.

For example, diolefin having a pair of conjugated double bonds can be used. Examples thereof may include 1,3-butadiene, 2-methyl-1,3-butadiene(isoprene), 2,3-dimethyl-1,3-butadiene, 1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene. Particularly general examples may include 1,3-butadiene and isoprene. These may be used singly, or in combinations of two or more.

When a copolymer containing a vinyl aromatic compound and a conjugated diene is used as the (B-I) vinyl aromatic-based copolymer, the amount of a conjugated diene monomer unit contained in the component (B-I) is preferably from 5 to 65 mass %, more preferably from 7 to 50 mass %, still more preferably from 10 to 40 mass %, and further preferably from 15 to 40 mass %, from the viewpoint of the adjustment of the mechanical strength of a desired foam or crosslinkability necessary when a crosslinked foam is obtained by crosslinking the foam.

From the viewpoint of light resistance, heat resistance or foamability, the component (B-I) is preferably hydrogenated, and the amount of the conjugated diene monomer unit can be arbitrarily changed by adjusting the hydrogenation rate to an unsaturated bond based on the conjugated diene compound prior to hydrogenation.

Adjusting the amount of the conjugated diene monomer unit contained in the component (B-I) to the above proportion allows the rates of crosslinking reactions of the (A) olefin-based copolymer and the (B-I) vinyl aromatic-based copolymer to be substantially equal. This reduces nonuniform crosslinking, produces fine and uniform cells, and further achieves crosslinking and foaming with a high degree of closed cells, thus resulting in a crosslinked foam having an excellent permanent compression set, impact resilience, and peel strength, as well as having an excellent appearance.

The microstructure of the conjugated diene portion (the cis, trans, and vinyl proportions) in the (B-I) vinyl aromatic-based copolymer prior to hydrogenation is not particularly limited, and it can be arbitrarily changed by the use of a polar compound and the like. From the viewpoint of productivity, the vinyl bond content in the diene is preferably 5% or more, and from the viewpoint of mechanical strength, it is preferably 80% or less. The vinyl bond content is more preferably from 10% to 70%, and still more preferably within a range of from 15% to 60%.

Moreover, when a copolymer containing a vinyl aromatic compound and a conjugated diene is used as the (B-I) vinyl aromatic-based copolymer, the component (B-I) is preferably a component in which 70% or more of the vinyl bond content in the conjugated diene monomer unit is hydrogenated by hydrogenation. Using such a vinyl aromatic-based copolymer, the crosslinking reaction at the vinyl bond site can be inhibited during crosslinking and foaming. Consequently, the impact resilience, tear strength, and permanent compression set of the resulting crosslinked foam can be improved.

The vinyl bond content based on the conjugated diene in the (B-I) vinyl aromatic-based copolymer, the hydrogenation rate of a copolymer, and the microstructure of the conjugated diene portion (the cis, trans, and vinyl proportions) prior to hydrogenation can be measured using a nuclear magnetic resonance apparatus (NMR).

As such a (B-I) vinyl aromatic-based copolymer, a vinyl aromatic-based copolymer containing a vinyl aromatic compound and alkylene can be used alone or with the above-mentioned copolymer of a vinyl aromatic compound and a conjugated diene.

In this case, the alkylene contained in the component (B-I) is not particularly limited, and any known alkylene can be used. An example of the alkylene is an α-olefin monomer. Specific examples thereof may include ethylene, propylene, 1-butene, isobutylene, and 4-methyl-1-pentene. In particular, ethylene, butene, methylpentene, and propylene are preferred. These substances may be used singly or in combinations of two or more.

The structure of the (B-I) vinyl aromatic-based copolymer is not particularly limited, and the component (B-1) with any structure can be used. A vinyl aromatic-based copolymer having at least one structure selected from the following general formulae (1) to (19) is particularly recommended.

(1) $(H\text{-}S)_n$
(2) $(H\text{-}E)_n$
(3) $H\text{-}(S\text{-}E)_n$
(4) $H\text{-}(E\text{-}S)_n$
(5) $H\text{-}(E\text{-}S)_n\text{-}H$
(6) $(H\text{-}S)_n\text{-}H$
(7) $(H\text{-}E)_n\text{-}H$
(8) $S\text{-}(H\text{-}S)_n$
(9) $S\text{-}(E\text{-}S)_n$
(10) $S\text{-}(E\text{-}H)_n$
(11) $E\text{-}(H\text{-}E)_n$
(12) $E\text{-}(S\text{-}E)_n$
(13) $E\text{-}(S\text{-}H)_n$
(14) $(H\text{-}S)_m\text{-}X$
(15) $(H\text{-}E)_m\text{-}X$
(16) $(H\text{-}S)_n\text{-}X\text{-}(H)_p$
(17) $(H\text{-}E)_n\text{-}X\text{-}(H)_p$
(18) $(H\text{-}E\text{-}S)_m\text{-}X$
(19) $(H\text{-}S\text{-}E)_m\text{-}X$ In the above general formulae (1) to (19), S represents a copolymer block mainly containing a conjugated diene and/or alkylene and a vinyl aromatic compound, H represents a polymer block mainly containing a vinyl aromatic compound, and E represents a polymer block mainly containing a conjugated diene and/or alkylene. The conjugated diene may be or may not be hydrogenated.

m represents an integer of 2 or greater, and preferably an integer from 2 to 10, and n and p each represent an integer of 1 or greater, and preferably an integer from 1 to 10.

X represents a coupling agent residue or a multifunctional initiator residue.

The phrase "mainly contain" means that the content is 60 mass % or more, preferably 80 mass % or more, more preferably 90 mass % or more, and still more preferably 95 mass % or more.

In the above general formulae (1) to (19), the structure of the (B-I) vinyl aromatic-based copolymer is preferably $(H\text{-}S)_n\text{-}H$ or $(H\text{-}E)_n\text{-}H$ from the viewpoint of productivity.

In the above general formulae (1) to (19), the distribution of the vinyl aromatic compound in a copolymer block S mainly containing a conjugated diene and/or alkylene and a vinyl aromatic compound (hereinafter also referred to simply as a copolymer block (S); the conjugated diene may be or may not be hydrogenated) is not particularly limited, as long as it satisfies the above-described range of the amount of the vinyl aromatic monomer unit in the (B-I) vinyl aromatic-based copolymer. Thus, the vinyl aromatic compound may be distributed either uniformly, or in a tapered, stepped, convex, or concave form. In addition, in the copolymer block (S), a plurality of segments each containing a different amount of vinyl aromatic compound may coexist.

When a copolymer containing a vinyl aromatic compound and a conjugated diene is used as the (B-I) vinyl aromatic-based copolymer, the distribution of double-bond hydrogenation based on the conjugated diene compound in the (B-I) vinyl aromatic-based copolymer is not particularly limited. Depending on characteristics such as mechanical strength, a large number of double bonds that are based on the conjugated diene compound may exist in one or more molecular end block portions of the copolymer.

The melt flow rate (JIS K-7210; 190° C.; load: 2.16 Kg) of the (B-I) vinyl aromatic-based copolymer is preferably 0.01 or more and 60 or less (measurement unit: g/10 min), more preferably 0.1 or more and 40 or less, still more preferably 0.5 or more and 35 or less, and further preferably 1.0 or more and 30 or less, from the viewpoint of fabricability, and the flexibility, peel strength, tensile strength and permanent compression set resistance of a crosslinked foam.

From the viewpoint of the mechanical strength such as tensile strength, and peel strength and permanent compression set resistance in the foam, the weight average molecular weight of the (B-I) vinyl aromatic-based copolymer is preferably 30,000 or more. From the viewpoint of fabricability, it is preferably 500,000 or less. The weight average molecular weight of the (B-I) vinyl aromatic-based copolymer is more preferably within a range of from 40,000 to 400,000, and still more preferably within a range of from 50,000 to 300,000.

The molecular weight distribution of the (B-I) vinyl aromatic-based copolymer is preferably from 1.01 to 6.00. From the viewpoint of fabricability, it is more preferably from 1.03 to 5.00, and still more preferably within a range of from 1.03 to 2.00.

The weight average molecular weight and molecular weight distribution of the (B-I) vinyl aromatic-based copolymer can be measured by using gel permeation chromatography (GPC).

The process for producing the (B-I) vinyl aromatic-based copolymer is not particularly limited, and any known techniques can be used.

When a copolymer containing a vinyl aromatic compound and a conjugated diene is used as the (B-I) vinyl aromatic-based copolymer, a block copolymer of the conjugated diene and the vinyl aromatic compound prior to hydrogenation can be obtained, for example, by living anionic polymerization performed in a hydrocarbon solvent, using an initiator such as an organoalkali metal compound.

Examples of hydrocarbon solvents may include aliphatic hydrocarbons such as n-butane, isobutane, n-pentane, n-hexane, n-heptane, and n-octane; alicyclic hydrocarbons such as cyclopentane, cyclohexane, cycloheptane, and methylcycloheptane; and aromatic hydrocarbons such as benzene, toluene, xylene, and ethylbenzene.

When a vinyl aromatic-based copolymer containing a vinyl aromatic compound and alkylene is used as the (B-I) vinyl aromatic-based copolymer, a block copolymer of the alkylene and the vinyl aromatic compound can be obtained, for example, by transition polymerization, radical polymerization, ionic polymerization, or the like.

A hydrogenated product is used as the (B-I) vinyl aromatic-based copolymer, the hydrogenation catalyst to be used is not particularly limited.

Any heretofore known hydrogenation catalyst can be used. Specific examples thereof may include:
(1) a support type heterogeneous hydrogenation catalyst having a metal such as Ni, Pt, Pd, Ru or the like supported on carbon, silica, alumina, diatomaceous earth or the like;
(2) a so-called Ziegler hydrogenation catalyst using an organic acid salt of Ni, Co, Fe, Cr or the like or a transition metal salt such as acetylacetone salt and a reducing agent such as organoaluminum; and
(3) a homogeneous hydrogenation catalyst such as so-called organometallic complex, e.g., an organometallic compound of Ti, Ru, Rh, Zr or the like. Specific hydrogenation catalysts are also usable, for example, those described in Japanese Patent Publication No. 42-8704, Japanese Patent Publication Nos. 43-6636, 63-4841, 1-37970, 1-53851, and 2-9041. Examples of preferred hydrogenation catalysts may include a mixture of titanocene compound and/or a reducing organometallic compound.

The hydrogenation reaction is typically performed at a temperature of from 0 to 200° C., and preferably from 30 to 150° C. The hydrogen pressure used in the hydrogenation reaction is typically from 0.1 to 15 MPa, preferably from 0.2 to 10 MPa, and more preferably from 0.3 to 5 MPa. The hydrogenation reaction time is typically from 3 minutes to 10 hours, and preferably from 10 minutes to 5 hours. The hydrogenation reaction can be performed using a batch process, a continuous process, or a combination thereof.

After the above-described hydrogenation reaction, the catalyst residue may be removed, as required, and the solvent is separated from the solution to obtain the (B-I) vinyl aromatic-based copolymer which is a hydrogenated product.

Examples of methods for separating the solvent may include a method in which a polar solvent such as acetone or an alcohol, which is a poor solvent for the vinyl aromatic-based copolymer and the like, is added to the hydrogenated reaction mixture to precipitate the vinyl aromatic-based copolymer, thereby collecting the vinyl aromatic-based copolymer; a method in which the reaction mixture is poured into hot water while stirring, and the solvent is removed by steam stripping, thereby collecting the polymer; and a method in which the copolymer solution is directly heated to distill off the solvent.

When the foamable composition of the present embodiment is used to obtain a foam, the (B-I) vinyl aromatic-based copolymer may contain stabilizers such as various phenol-based stabilizers, phosphorus-based stabilizers, sulfur-based stabilizers, and amine-based stabilizers.

The (B-I) vinyl aromatic-based copolymer may be a modified vinyl aromatic-based copolymer, to which at least one atomic group comprising a predetermined functional group binds as a result of reaction with a functional group-containing compound.

An example of the atomic group containing a functional group is an atomic group containing at least one functional group selected from among a hydroxyl group, a carbonyl group, a thiocarbonyl group, an acid halide group, an acid anhydride group, a carboxyl group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a cyano group, a pyridyl group, a quinoline group, an epoxy group, a thioepoxy group, a sulfide group, an isocyanate group, an isothiocyanate group, a halogenated silicon group, a silanol group, an alkoxysilane group, a halogenated tin group, an alkoxy tin group, a phenyltin group, a boronic acid group, a boronic acid salt group, a boron-containing group, and the like.

Among these, a hydroxyl group, a carbonyl group, an acid anhydride group, a carboxyl group, an epoxy group, an amino group, a silanol group, and the like are preferred.

Such a modified vinyl aromatic-based copolymer can be obtained using, for example, a polymerization initiator having a functional group or an unsaturated monomer having a functional group, by subjecting a copolymer obtained as a result of polymerization to hydrogenation, or by performing an addition reaction of a modifier forming or containing a functional group to a copolymer having a living end that is obtained as a result of anionic polymerization, followed by hydrogenation.

Another example of the method of obtaining a modified vinyl aromatic-based copolymer is a method which comprises allowing a block copolymer to react with an organoalkali metal compound such as an organic lithium compound (metallation reaction), and then performing an addition reaction of a functional group-containing modifier to the organoalkali metal-added polymer.

In the case of the latter method, it is also possible that a metallation reaction is carried out after a hydrogenated product of the copolymer has been obtained, and that a modifier is then allowed to react with the resultant, so as to obtain a modified copolymer.

In all of the above-described modification methods, the reaction temperature is preferably from 0 to 150° C., and more preferably from 20 to 120° C.

The time required for the modification reaction varies different depending on other conditions. It is preferably within 24 hours, and more preferably from 0.1 to 10 hours. Depending on the type of a modifier, a hydroxyl group, an amino group and the like have been generally converted to organic metal salts at a stage at which the modifier is allowed to react. In such a case, the organic metal salts can be converted to a hydroxyl group, an amino group and the like, by treating them with a compound having active hydrogen, such as water or alcohol.

In such a modified vinyl aromatic-based copolymer, a partially unmodified vinyl aromatic-based copolymer may be mixed with the modified vinyl aromatic-based copolymer.

Moreover, when a modified vinyl aromatic-based copolymer is used as such a (B-I) vinyl aromatic-based copolymer, a secondary modifier having reactivity with a functional group of the modified vinyl aromatic-based copolymer is allowed to further react with the aforementioned modified vinyl aromatic-based copolymer to form a secondary modified vinyl aromatic-based copolymer.

The secondary modifier is a secondary modifier that has a functional group having reactivity with a functional group of the aforementioned modified copolymer. It is preferably a secondary modifier having a functional group selected from among a carboxyl group, an acid anhydride group, an isocyanate group, an epoxy group, a silanol group, and an alkoxysilane group.

The secondary modifier is a secondary modifier having at least two functional groups selected from the aforementioned functional groups. When the functional group is an acid anhydride group, the secondary modifier may also be a secondary modifier having one acid anhydride group.

When a secondary modifier is allowed to react with the modified vinyl aromatic-based copolymer, the secondary modifier is used in an amount of from 0.3 to 10 moles, preferably from 0.4 to 5 moles, and more preferably from 0.5 to 4 moles, per equivalent of functional group bound to the modified vinyl aromatic-based copolymer. A method of reacting the modified vinyl aromatic-based copolymer with the secondary modifier is not particularly limited, and any known methods can be used. Examples of such a known method may include a melt-kneading method described later and a method which comprises dissolving or dispersing and mixing individual components in a solvent or the like and then reacting them.

Particularly preferred examples of the secondary modifier may include carboxylic acid having two or more carboxyl groups or an acid anhydride thereof, and a secondary modifier having two or more acid anhydride groups, isocyanate groups, epoxy groups, silanol groups or alkoxysilane groups. Specific examples may include maleic anhydride, pyromellitic dianhydride, 1,2,4,5-benzenetetracarboxylic dianhydride, toluylenediisocyanate, tetraglycidyl-1,3-bisaminomethylcyclohexane, and bis-(3-triethoxysilylpropyl)-tetrasulfane.

As a modified (B-I) vinyl aromatic-based copolymer, a modified copolymer which is graft-modified with an α,β-unsaturated carboxylic acid or its derivative, for example, its anhydride, ester, amide, imide can be used.

Specific examples of α,β-unsaturated carboxylic acids or their derivatives may include maleic anhydride, maleic anhydride imide, acrylic acid or its esters, methacrylic acid or its esters, and endo-cis-bicyclo[2.2.1]-5-heptene-2,3-dicarboxylic acid or its anhydride.

The amount of the α,β-unsaturated carboxylic acid or its derivative to be added is typically from 0.01 to 20 mass parts, and preferably from 0.1 to 10 mass parts, based on 100 mass parts of the (B-I) vinyl aromatic-based compound.

The reaction temperature in the graft modification is preferably from 100 to 300° C., and more preferably from 120 to 280° C. Detailed description of the method of graft modification can be referred to Japanese Patent Laid-Open No. 62-79211, for example.

When the (B-I) vinyl aromatic-based copolymer is a modified vinyl aromatic-based copolymer or a secondary modified vinyl aromatic-based copolymer, a functional group binding to the modified vinyl aromatic-based copolymer has reactivity with the above-described secondary modifier, or with an olefin-based thermoplastic resin containing a functional group, the (C) inorganic filler, a polar group-containing additive, and the like, which are mixed, as required, when the foamable composition of the present embodiment is produced. At the same time, since the modified hydrogenated vinyl aromatic-based copolymer contains a nitrogen atom, an oxygen atom, or a carbonyl group, an interaction can be effectively generated between such a functional group, a nitrogen atom, an oxygen atom or carbonyl group, and the polyolefin-based thermoplastic resin, the inorganic filler, a polar group in the polar group-containing additive, and the like, as a result of physical affinity such as a hydrogen bond, so that the present invention can further exhibit the desired effects.

The tan δ peak temperature of the (B-I) vinyl aromatic-based copolymer, which is determined by dynamic viscoelasticity measurement (1 Hz), can be arbitrarily changed depending on the impact resilience of a desired foam.

For example, when impact absorption properties are required to be imparted to the foam, the (B-I) vinyl aromatic-based copolymer preferably has a tan δ peak temperature within a range of more than 0° C. and 30° C. or less, the tan δ value at 15° C. is preferably 0.4 or more, and the impact resilience of the (crosslinked) foam is preferably 30% or less.

Moreover, when high resilience is required to be imparted to the foam, the (B-I) vinyl aromatic-based copolymer preferably has a tan δ peak temperature of 0° C. or less, and the impact resilience of the foam is preferably from 30% to 80%.

Examples of a method for controlling the above-described tan δ peak temperature and tan δ value may include a method of allowing the vinyl aromatic-based copolymer to contain a random copolymer block of a vinyl aromatic compound and a hydrogenated conjugated diene and/or alkylene; and a method of adjusting the amount and distribution of vinyl derived from a conjugated diene prior to hydrogenation, and the amount of a conjugated diene hydrogenated, or the amount, distribution and molecular weight distribution of α-olefin containing 3 or more carbon atoms derived from alkylene, or the amount of a block mainly containing a vinyl aromatic compound.

The dynamic viscoelasticity data is a value obtained by cutting a sample to a size of 10 mm wide and 35 mm long, setting it into a twisted type geometry of an apparatus, ARES (trade name, manufactured by TA Instruments—Waters LLC), and measuring the dynamic viscoelasticity of the sample under the following conditions: effective measured length: 25 mm; strain: 0.5%; frequency: 1 Hz; and a temperature rise rate from −50° C. to 50° C. of 3° C./min.

The peak temperature can be obtained by automatic measurement using RSIOrchestrator (trade name, manufactured by TA Instruments—Waters LLC).

<(B-II) Ethylene-based Copolymer Having Unsaturated Group>

As described above, the copolymer (B) that constitutes the foamable composition of the present embodiment comprises (B-I) a vinyl aromatic-based copolymer and/or (B-II) an ethylene-based copolymer having an unsaturated group, and (B-I)/(B-II) is from 100/0 to 0/100, preferably 60/40, more preferably 90/10, and still more preferably 100/0.

The (B-II) ethylene-based copolymer containing an unsaturated group (hereinafter sometimes also described simply as a component (B-II)) is not particularly limited, and any known components can be used. Examples thereof may include an ethylene-based copolymer obtainable by copolymerizing a non-conjugated diene and a copolymer of ethylene and α-olefin such as propylene, 1-butene or 1-pentene.

Examples of the non-conjugated diene may include 5-ethylidene-2-norbornene(ENB), 1,4-hexadiene, 5-methylene-2-norbornene(MNB), 1,6-octadiene, 5-methyl-1,4-hexadiene, 3,7-dimethyl-1,6-octadiene, 1,3-cyclopentadiene, 1,4-cyclohexadiene, tetrahydroindene, methyl tetrahydroindene, dicyclopentadiene, 5-isopropylidene-2-norbornene, 5-vinyl-norbornene, dicyclooctadiene, methylene norbornene. Among these, ethylene-propylene-non-conjugated diene copolymer (EPDM) is preferred from the viewpoint of crosslinkability.

The (B-II) ethylene-based copolymer containing an unsaturated group may be a modified ethylene-based copolymer containing an unsaturated group, to which at least one atomic group comprising a predetermined functional group binds as a result of reaction with a functional group-containing compound.

Examples of the atomic group comprising a functional group may include an atomic group containing at least one type selected from among a hydroxyl group, a carbonyl group, a thiocarbonyl group, an acid halide group, an acid anhydride group, a carboxyl group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a cyano group, a pyridyl group, a quinoline group, an epoxy group, a thioepoxy group, a sulfide group, an isocyanate group, an isothiocyanate group, a halogenated silicon group, a silanol group, an alkoxysilane group, a halogenated tin group, an alkoxy tin group, a phenyltin group, a boronic acid group, a boronic acid salt group, a boron-containing group, and the like.

In particular, a hydroxyl group, a carbonyl group, an acid anhydride group, a carboxyl group, an epoxy group, an amino group, a silanol group, and the like are preferred.

In such a modified ethylene-based copolymer containing an unsaturated group, a partially unmodified ethylene-based copolymer containing an unsaturated group may be mixed with the modified ethylene-based copolymer containing an unsaturated group.

The mass ratio of the (A) olefin-based copolymer to the (B) vinyl aromatic-based copolymer and/or ethylene-based copolymer containing an unsaturated group, (A/B), can be arbitrarily changed within a range of from 5/95 to 100/0, depending on the specific gravity, hardness, physical properties and impact resilience of a desired foam. When a foam having impact absorption properties is intended to be produced, the (A/B) is preferably from 5/95 to 60/40, more preferably from 10/90 to 55/45, still more preferably from 15/85 to 50/50, and further preferably from 20/80 to 45/55.

On the other hand, when a foam having high resilience is intended to be produced, the (A/B) is preferably from 60/40 to 100/0, more preferably from 70/30 to 98/2, still more preferably from 75/25 to 95/5, and further preferably from 80/20 to 93/7.

The above-described mass ratio (A/B) can be controlled by adjusting the amounts of raw materials added during production of a foamable composition.

((C) Inorganic Filler)

The (C) inorganic filler (hereinafter sometimes also described simply as a component (C)) is a common filler that is blended into a thermoplastic resin or a rubber polymer. The (C) inorganic filler is not particularly limited.

From the viewpoint that the (C) inorganic filler is dispersed in the foamable composition of the present embodiment so that the effect of adding the inorganic filler can be sufficiently exhibited, the mean dispersed particle diameter of the (C) inorganic filler is preferably from 0.01 to 4 μm, more preferably from 0.02 to 1 μm, and still more preferably from 0.02 to 0.5 μm.

The mean dispersed particle diameter of the (C) inorganic filler can be obtained by observing the dispersed state of the inorganic filler under a transmission electron microscope (TEM) and then using an image analyzer.

Examples of the (C) inorganic filler may include talc, calcium carbonate, silica, calcium silicate, hydrotalcite, kaoline, diatomaceous earth, graphite, calcium carbonate, magnesium carbonate, magnesium hydroxide, aluminum hydroxide, calcium sulfate, barium sulfate, magnesium oxide, zinc oxide, and titanium oxide.

From the viewpoint of a reinforcement-improving effect and the like, among these, an inorganic filler selected from the group consisting of silica-based inorganic fillers, metal oxides, and metal hydroxides are preferred.

The silica-based inorganic filler herein means solid particles containing a constitutional unit represented by the chemical formula $SiO_2$ or $Si_3Al$ as a main component. For example, silica, clay, talc, mica, wollastonite, montmorillonite, zeolite, and inorganic fibrous substances such as glass fiber can be used.

In addition, the metal oxide means solid particles containing a constitutional unit represented by the chemical formula $M_xO_y$ (wherein M represents a metal atom, and x and y each represent an integer from 1 to 6) as a main component. For example, alumina, titanium oxide, magnesium oxide, zinc oxide, or the like can be used. Moreover, a mixture of two or more types of metal oxides and a mixture of a metal oxide and an inorganic filler other than a metal oxide can also be used.

Furthermore, the metal hydroxide is a hydrated inorganic filler. Examples of the metal hydroxide that can be used may include the hydrates of aluminum hydroxide, magnesium hydroxide, zirconium hydroxide, hydrated aluminum silicate, hydrated magnesium silicate, basic magnesium carbonate, hydrotalcite, calcium hydroxide, barium hydroxide and tin oxide; and the hydrates of inorganic metal compounds such as borax. A mixture of two or more types of metal hydroxides and a mixture of a metal hydroxide and an inorganic filler other than a metal hydroxide can also be used.

Among the above-mentioned various inorganic fillers, silica and talc are preferred from the viewpoint of mechanical strength such as tensile strength, and peel strength and permanent compression set resistance in the foam of the present embodiment. In particular, silica is preferred from the viewpoint of the maintenance of hardness while it is lightweight, and peel strength. Further, a silica-based inorganic filler having a hydrophobic surface, a mixture of two or more types of silica-based inorganic fillers, and a mixture of a silica-based inorganic filler and an inorganic filler other than a silica-based inorganic filler can also be used. Examples of the silica that can be used may include dry process silica, wet process silica, synthetic silicate-based silica, and silica called colloidal silica.

Moreover, in terms of the achievement of the effect of adding such an inorganic filler, the amount of the (C) inorganic filler is 0.5 mass parts or more, based on 100 mass parts of the total amount of the (A) olefin-based copolymer and the copolymer (B), from the viewpoint of processability and mechanical strength because of dispersibility, the amount of the (C) inorganic filler is 35 mass parts or less. The amount of the (C) inorganic filler is preferably from 0.5 to 15 mass parts, and more preferably from 0.5 to 7 mass parts.

((D) Organic Silane Coupling Agent)

From the viewpoint of a reinforcement-improving effect and the improvement of adhesiveness with a primer, an adhesive or the like for the purpose of adhering them to other substrates, the (D) organic silane coupling agent is more preferably an organic silane coupling agent having a group having affinity for or binding ability to the component (A) and/or the component (B), and further the surface of the component (C).

The (D) organic silane coupling agent (hereinafter sometimes also described simply as a component (D)) that constitutes the foamable composition of the present embodiment is not particularly limited, as long as it is generally used in the blending of a rubber polymer.

Examples of the (D) organic silane coupling agent may include bis(3-triethoxysilyl propyl)tetrasulfide, bis(3-triethoxysilyl propyl)trisulfide, bis(3-triethoxysilyl propyl)disulfide, bis(2-triethoxysilyl ethyl)tetrasulfide, bis(3-trimethoxysilyl propyl)tetrasulfide, bis(2-trimethoxysilyl ethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilyl propyl-N,N-dimethyl thiocarbamoyl tetrasulfide, 3-triethoxysilyl propyl-N,N-dimethyl thiocarbamoyl tetrasulfide, 2-triethoxysilyl ethyl-N,N-dimethyl thiocarbamoyl tetrasulfide, 3-trimethoxysilyl propyl benzothiazole tetrasulfide, 3-triethoxysilyl propyl benzothiazole tetrasulfide, 3-triethoxysilyl propyl methacrylate monosulfide, 3-trimethoxysilyl propyl methacrylate monosulfide, bis(3-diethoxymethyl silyl propyl)tetrasulfide, 3-mercaptopropyl dimethoxymethyl silane, dimethoxymethyl silyl propyl-N,N-dimethyl thiocarbamoyl tetrasulfide, dimethoxymethyl silyl propyl benzothiazole tetrasulfide, 3-hexanooyl thiopropyl triethoxysilane, 3-octanoyl thiopropyl triethoxysilane, 3-decanoyl thiopropyl triethoxysilane, 3-lauroyl thiopropyl triethoxysilane, 2-hexanoyl thioethyl triethoxysilane, 2-octanoyl thioethyl triethoxysilane, 2-decanoyl thioethyl triethoxysilane, 2-lauroyl thioethyl triethoxysilane, 3-hexanoyl thiopropyl trimethoxysilane, 3-octanoyl thiopropyl trimethoxysilane, 3-decanoyl thiopropyl trimethoxysilane, 3-lauroyl thiopropyl trimethoxysilane, 2-hexanoyl thioethyl trimethoxysilane, 2-octanoyl thioethyl trimethoxysilane, 2-decanoyl thioethyl trimethoxysilane, 2-lauroyl thioethyl trimethoxysilane, p-styryl trimethoxysilane, allyl trimethoxysilane, allyl triethoxysilane, allyl trichlorosilane, N-(2aminoethyl)3-aminopropyl trimethoxysilane, N-(2aminoethyl)3-aminopropyl methyl dimethoxysilane, 3-aminopropyl trimethoxysilane, 3-aminopropyltriethoxysilane, diethoxymethyl vinyl silane, triethoxyvinyl silane, vinyl tris(2-methoxyethoxy)silane, vinyl trichlorsilane, vinyltriethoxysilane, vinyltrimethoxysilane.

Examples of a group exhibiting affinity for or binding ability to the unsaturated bonds of the component (A) and the component (B) may include a sulfide group, a vinyl group, and an amino group. Examples of a group exhibiting affinity for or binding ability to the surface of the (C) inorganic filler may include a methoxysilyl group and an ethoxysilyl group.

As a component (D), a polysulfide silane coupling agent and a vinyl group-containing silane coupling agent are preferred, and bis(3-triethoxysilylpropyl)polysulfide, 3-trimethoxysilylpropylbenzothiazole tetrasulfide, and the like are more preferred.

If the (D) organic silane coupling agent having a vinyl group or an amino group, such as vinyltrimethoxysilane, vinyltriethoxysilane or 3-aminopropyltrimethoxysilane, is used, radical generators such as an organic peroxide and an azo compound may be added, when the vinyl group or amino group of the component (D) is added to the component (A) or the component (B) by a radical addition reaction.

Furthermore, the amount of the (D) organic silane coupling agent is from 0.1 to 50 mass parts, and preferably from 0.5 to 20 mass parts, based on 100 mass parts of the (C) inorganic filler.

The (D) organic silane coupling agent may be used singly or in combinations of two or more.

((E) Foaming Agent)

The (E) foaming agent (hereinafter sometimes also described simply as a component (E)) that constitutes the foamable composition of the present embodiment is not particularly limited, and any known foaming agents can be used.

Examples of the (E) foaming agent may include organic thermally decomposable foaming agents such as azodicarbonamide (ADCA), N,N'-dinitrosopentamethylenetetramine, 4,4'-oxybis(benzenesulfonyl hydrazide), diphenylsulfone-3,3'-disulfonyl hydrazide, p-toluenesulfonyl semicarbazide, and trihydrazinotriazine; and inorganic thermally decomposable foaming agents such as sodium hydrogencarbonate, sodium carbonate, ammonium hydrogencarbonate, and ammonium carbonate.

Among these, azodicarbonamide (ADCA) and sodium hydrogencarbonate are preferred from the viewpoint of their cost and reactivity.

The amount of the (E) foaming agent is from 0.1 to 20 mass parts based on 100 mass parts of the total amount of the (A) olefin-based copolymer and the copolymer (B). The amount of the (E) foaming agent is preferably from 1 to 18 mass parts, and more preferably from 2 to 15 mass parts. When the component (E) is used in the above proportion, a foam having a high expansion ratio and a high degree of closed cells can be obtained.

(Metal Compound)

The foamable composition of the present embodiment may contain, as required, an organic metal compound containing a metal selected from the metals in the groups 2 to 12 of the periodic table.

For example, zinc diacrylate (ZDA) and zinc dimethacrylate (ZDMA) are preferred. The addition of these organic metal compounds increases the gel content in the resulting foam, allowing foam cells to be finer and more uniform.

((F) Crosslinking Agent)

The foamable composition of the present embodiment may contain, as required, a (F) crosslinking agent (hereinafter sometimes also described simply as a component (F)), and thereby a crosslinked foamable composition (hereinafter sometimes also described as a crosslinkable and foamable composition) can be obtained.

The (F) crosslinking agent is not particularly limited, and any known crosslinking agent can be used. Examples of the (F) crosslinking agent may include a radical generator such as an organic peroxide.

The amount of the (F) crosslinking agent is preferably from 0.1 to 20 mass parts, and more preferably from 0.1 to 15 mass parts, based on 100 mass parts of the total amount of the (A) olefin-based copolymer and the copolymer (B).

Specific examples of organic peroxides may include dicumyl peroxide, di-t-butylperoxide, 2,5-dimethyl-2,5-di-(t-butylperoxy)hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxy benzoate, t-butyl perbenzoate, t-butyl peroxyisopropyl carbonate, diacetyl peroxide, lauroyl peroxide, and t-butyl cumyl peroxide.

These organic peroxides can be used singly or as a mixture of two or more.

Among the organic peroxides, dicumyl peroxide, di-t-butylperoxide, and 2,5-dimethyl-2,5-di-(t-butylperoxy) hexane are preferred from the viewpoint of reactivity.
(Crosslinking Coagent)

When crosslinking is carried out using the above-described organic peroxide, a crosslinking coagent can be used in combination. Examples of such a crosslinking coagent may include peroxy crosslinking coagents such as sulfur, p-quinonedioxime, p,p'-dibenzoyl quinonedioxime, N-methyl-N-4-dinitrosoaniline, nitrosobenzene, diphenylguanidine, and trimethylolpropane-N,N'-m-phenylenedimaleimide; polyfunctional methacrylate monomers such as divinylbenzene, triallyl isocyanurate, triallyl cyanurate, ethylene glycol dimethacrylate, diethylene glycol dimethacrylate, polyethylene glycol dimethacrylate, trimethylolpropane trimethacrylate, and allyl methacrylate; and polyfunctional vinyl monomers such as vinyl butyrate and vinyl stearate.

The amount of such a crosslinking coagent blended is preferably from 0.01 to 20 mass parts based on 100 mass parts of the total amount of the (A) olefin-based copolymer and the copolymer (B), and the crosslinking coagent is more preferably used in a proportion of from 0.1 to 15 mass parts.

Moreover, as the above-described crosslinking coagents, sulfonamide-based, guanidine-based, thiuram-based, aldehyde-amine-based, aldehyde-ammonia-based, thiazole-based or thiourea-based, dithiocarbamate-based vulcanization promoters, and the like can be used in necessary amounts.

Furthermore, as such crosslinking coagents, flower of zinc, stearic acid, and the like may also be used in necessary amounts.
(Additive)

The foamable composition of the present embodiment can contain, as required, various additives such as fillers, thermal stabilizers, weathering stabilizers, flame retardants, hydrochloric acid absorbents, and pigments, within a range that does not impair the purpose of the present embodiment.

The types of the additives are not particularly limited. Examples of fillers may include carbon black, carbon nanotube, and fullerene.

Moreover, examples of thermal stabilizers may include phosphorus-based stabilizers such as Irgafos 168, lactone-based stabilizers such as HP-136, and sulfur-based stabilizers.

Examples of weathering stabilizers may include hindered phenol-based weathering stabilizers, phosphite-based weathering stabilizers, and thioether-based weathering stabilizers.

Examples of flame retardants may include red phosphorus-based flame retardants, halogen-based flame retardants, organophosphate-based flame retardants, and inorganic flame retardants.

Examples of hydrochloric acid absorbents may include calcium stearate.

Examples of pigments may include azo-based pigments, phthalocyanine-based pigments, oxide-based pigments such as titanium oxide, chromate- and molybdate-based pigments, and inorganic pigments such as selenium sulfide compounds, ferrocyanide compounds and carbon black.
[A process for producing foamable composition]

The foamable composition of the present embodiment can be prepared by melt-mixing specific proportions of (A) an olefin-based copolymer, (B) (B-I) a vinyl aromatic-based copolymer and/or (B-II) an ethylene-based copolymer containing an unsaturated group, (C) an inorganic filler, (D) an organic silane coupling agent, (E) a foaming agent, and as required, (F) a crosslinking agent in a kneader at a temperature at which the components (E) and (F) do not decompose (in a case where the component (F) is contained, at a temperature at which the components (E) and (F) do not decompose).

In the production step of the foamable composition of the present embodiment, melt-mixing can be performed using any known method. Melt-mixing can be performed using, for example, an extruder such as a single-screw extruder, twin-screw extruder and multi-screw extruder, a Henschel mixer, a Banbury mixer, a roll mill, or a kneader.

Other usable methods may include a method in which the individual components are mixed by dissolving or dispersing them, and the solvent is subsequently removed.

In the present embodiment, melt-mixing is preferably performed using an extruder, from the viewpoint of productivity and kneading performance.

The mixing method is not particularly limited. Preferred examples of the mixing method may include a method which comprises previously melt-kneading the component (B), the component (C) and the component (D) at a first stage using an extruder to obtain a master batch pellet, and then melt-kneading the component (A), the component (E), and as required, the component (F), at a second stage at a temperature at which the component (E) and the component (F) do not decompose, so as to prepare a foamable composition; and a method which comprises previously melt-kneading the component (A), the component (B), the component (C) and the component (D) at a first stage using an extruder to obtain a master batch pellet, and then melt-kneading the component (E), and as required, the component (F), at a second stage at a temperature at which the component (E) and the component (F) do not decompose, so as to prepare a foamable composition.

The "temperature at which the component (E) and the component (F) do not decompose" may be selected, as appropriate, depending on the types of the component (E) and the component (F). From the viewpoint of the balance with melt-kneading property, for example, the temperature is preferably from 80 to 200° C., more preferably from 90 to 160° C., and still more preferably from 100 to 120° C.

Moreover, the temperature at which melt-kneading is carried out with the extruder at the first stage is preferably within a range of from 120° C. to 250° C., more preferably within a range of from 150° C. to 240° C., and still more preferably within a range of from 180° C. to 230° C.

The shape of the foamable composition of the present embodiment is not particularly limited; the composition may be molded into any desired shape. Examples of shapes of the composition may include pellets, sheets (sometimes also referred to as films), strands, and chips. For example, the individual components can be mixed in a pelletizer or the like to form pellets, as required.

The foamable composition of the present embodiment is molded into a sheet by any known method.

Examples of methods may include a method in which the pellets of the foamable composition of the present embodiment are molded using an extruder or calender machine; a method in which the individual components of the foamable composition of the present embodiment are kneaded in a Brabender mixer or the like, and then molded into a sheet using calender rolls; a method in which the crosslinkable and foamable composition of the present embodiment is formed into a sheet using a press molding machine; and a method in which the individual components are kneaded using an extruder, and the mixture is subsequently extruded through a T-die or ring die to be molded into a sheet. In this manner, an uncrosslinked and unfoamed, foamable sheet can be obtained.

[Foam]

A foam can be obtained by foaming the foamable composition of the present embodiment. Furthermore, the foam of the present embodiment may also be a foam which is crosslinked by addition of a crosslinking agent and addition of a crosslinking step (hereinafter sometimes also described simply as a crosslinked foam in the present specification).

In the foam of the present embodiment, defoaming during foaming and nonuniform crosslinking occurring during a crosslinking reaction are effectively suppressed, and the foam has excellent molding stability, processability and appearance. Moreover, the foam of the present embodiment enables foaming at a high expansion ratio, which has been conventionally difficult, and it is lightweight and flexible and has also excellent permanent compression set, peel strength, adhesive strength, impact resilience, and the like.

The foam of the present embodiment preferably has a specific gravity of from 0.01 to 0.70 and a hardness (Shore C) of 15 to 70.

In general, if the expansion ratio is increased (the specific gravity is decreased), mechanical strength and the like are decreased. However, the foam of the present embodiment can maintain its hardness even though it has a low specific gravity.

Considering the balance between physical properties such as mechanical strength, impact resilience or permanent compression set, and specific gravity, the specific gravity is preferably from 0.05 to 0.50, more preferably from 0.05 to 0.35, still more preferably from 0.05 to 0.20, and further preferably from 0.07 to 0.20.

The foam of the present embodiment can realize a low specific gravity of from 0.07 to 0.20 and can maintain a hardness (Shore C) of from 15 to 70. When a footwear is produced using the foam, the hardness is preferably from 30 to 70, more preferably from 40 to 65, and still more preferably from 45 to 60, from the viewpoint of flexibility and foot comfort (hardness).

Moreover, the foam of the present embodiment preferably has peel strength/specific gravity of 18 or more, and it can maintain mechanical strength as well as hardness, even though it has a low specific gravity.

As a crosslinking method applied to convert the foamable composition of the present embodiment to a crosslinked foam, a commonly used method can be used.

For example, the present foamable composition is crosslinked by heating at a temperature of from 80 to 200° C., and preferably at a temperature of from 100 to 180° C.

The crosslinking method is not particularly limited. Examples of the crosslinking method may include a chemical method using an organic peroxide, a method of crosslinking with a copolymer composition by metal ion crosslinking, silane crosslinking, resin crosslinking or the like, and a method comprising molding the foamable composition by extrusion molding, injection molding or the like, and then performing physical crosslinking using electron beam, radioactive ray or the like, water crosslinking, etc. These methods may also be used in combination. From the viewpoint of convenience and productivity, chemical crosslinking using an organic peroxide is preferred.

Furthermore, the foamable composition of the present embodiment can be foamed, as required, crosslinked by press molding or injection molding.

For example, the foam of the present embodiment may be molded into a predetermined shape, using the foamable composition in pelletized form. The foam may be molded into a sheet. Then, a foam and crosslinked foam which is crosslinked as required by press, may be produced.

The following is an example of the case of foaming the foamable sheet obtainable by molding the foamable composition of the present embodiment into a sheet.

The foamable sheet is cut into dimensions from 1.0 to 1.2 times greater than the dimensions of the mold volume, and then inserted into the mold being maintained at from 120 to 200° C. With a mold clamping pressure of from 30 to 300 kgf/cm$^2$, and a mold hold time of from 10 to 90 minutes, the foamable sheet is pressurized and melted, causing the crosslinking reactions and the decomposition of the foaming agent; subsequently, the mold is opened to cause foaming of the composition, thereby preparing a primary crosslinked foam.

The shape of the mold for crosslinking and foaming in the preparation of the primary crosslinked foam is not particularly limited; for example, a mold that is configured to give a sheet is used. The mold for crosslinking and foaming preferably has a completely hermetical structure so as to prevent leakage of the gases emitted during melting of the resin or decomposition of the foaming agent. The mold frame is preferably a mold frame having a taper on its inner surface, from the viewpoint of the mold releasability of the resin.

In the present embodiment, the primary crosslinked foam may, as required, be provided with a predetermined shape by compression molding into a second-order crosslinked foam. The compression molding conditions at this time are not particularly limited; however, it is preferred that the mold temperature be within the range of from 120 to 200° C., the mold clamping pressure be within the range of from 30 to 300 kgf/cm$^2$, the compression time be within the range of from 5 to 60 minutes, and the compression ratio be within the range of from 1.1 to 3.0, for example.

In the present embodiment, foamed materials can be produced by molding the foamable resin composition into various shapes or dimensions other than a sheet. In the present embodiment, the shape or dimensions of the produced foam, as well as the foamable composition that forms the foam, are not particularly limited, and the foam or composition can be molded into various shapes other than a sheet.

The foam of the present embodiment can be utilized as sheets (sometimes also referred to as films), injection-molded articles, blow-molded articles, pressure-molded articles, vacuum-molded articles, and extrusion-molded articles of various shapes, and the like.

In particular, the foam of the present embodiment, which serves as a material that is lightweight and flexible, and has excellent permanent compression set, peel strength, and impact resilience, as well as excellent molding stability, processability and adhesiveness, can find a wide range of applications such as automobile-related members, construction-related materials, various packaging materials, and daily necessities. Among these applications, the crosslinked foam can be suitably used as a footwear, in particular, as a shoe midsole.

EXAMPLES

The present invention will be described in detail below, referring to specific examples and comparative examples; however, the present invention is not limited to examples below.

In examples and comparative examples, vinyl aromatic-based copolymers were prepared and crosslinked foams were prepared according to the methods described below, and their physical properties were evaluated. The properties of each vinyl aromatic-based copolymer and the physical properties of each crosslinked foam were measured as below.

[Measurement of Properties of Vinyl Aromatic-Based Copolymer]

((1) Styrene content, vinyl bond content in conjugated diene, hydrogenation rate of unsaturated bond based on conjugated diene compound, amounts of vinyl aromatic monomer unit, 1,4-bond unit and 1,2-bond unit in butadiene, ethylene unit, or butylene unit)

These values were measured by nuclear magnetic resonance spectral analysis (NMR).

JNM-LA400 (trade name, manufactured by JEOL Ltd.) was used as a measurement apparatus, and deuterated chloroform was used as a solvent. The concentration of a sample was set at 50 mg/mL, and the observing frequency was set at 400 MHz. TMS (tetramethylsilane) was used as a chemical shift standard, and the measurement was carried out under the following conditions: a pulse delay: 2.904 sec; the number of scanning operations: 64 times, a pulse width: 45°; and a measurement temperature: 26° C.

((2) Measurement of Polystyrene Block Content)

The content of a polystyrene block was measured according to the osmium tetroxide method described in I. M. Kolthoff, et al., J. Polym. Sci. 1, 429 (1946), using a vinyl aromatic-based copolymer before hydrogenation. A 0.1 g/125 mL tertiary butanol solution of osmic acid solution was used to decompose the vinyl aromatic-based copolymer.

((3) Measurement of Weight Average Molecular Weight and Molecular Weight Distribution)

The weight average molecular weight and molecular weight distribution of a vinyl aromatic-based copolymer were obtained relative to the molecular weight in terms of polystyrene, by gel permeation chromatography (GPC) measurement (apparatus: LC-10 (trade name, manufactured by Shimadzu Corporation); column: two columns of TSK-gelGMHXL (4.6 mm ID×30 cm); solvent: tetrahydrofuran (flow rate: 1.0 mL/min), column temperature: 40° C.), using commercially available standard polystyrene. Moreover, the molecular weight distribution was obtained in the form of the ratio between the obtained weight average molecular weight and number average molecular weight.

((4) Content of Modified Vinyl Aromatic-based Copolymer)

The characteristic of a modified component to be adsorbed on a GPC column containing silica-based gel as a filler was applied. As for a sample solution containing a modified vinyl aromatic-based copolymer and a low-molecular-weight internal standard polystyrene, the ratio of the modified vinyl aromatic-based copolymer to the standard polystyrene in the chromatogram measured in (3) above was compared with the ratio of the modified vinyl aromatic-based copolymer to standard polystyrene in a chromatogram measured by a silica-based column GPC [column: Zorbax, manufactured by Du Pont Kabushiki Kaisha; solvent: tetrahydrofuran (flow rate: 0.5 mL/min); and column oven temperature: 40° C.], and the obtained difference was used for measuring the amount of the modified vinyl aromatic-based copolymer adsorbed on the silica column. The ratio of an unmodified vinyl aromatic-based copolymer corresponds to the ratio of the vinyl aromatic-based copolymer that has not been adsorbed on the silica column.

The ratio of the modified vinyl aromatic copolymer was calculated based on these results.

((5) Measurement of Dynamic Viscoelasticity Data)

The after-mentioned vinyl aromatic-based copolymers (B1 to B4) were each cut into a size of 10 mm wide and 35 mm long, so as to prepare test pieces to be measured. The thus prepared test pieces were each set into a twisted type geometry of an apparatus, ARES (trade name, manufactured by TA Instruments—Waters LLC), and the dynamic viscoelasticity data of each test piece was measured under the following conditions: effective measured length: 25 mm; strain: 0.5%; frequency: 1 Hz; and a temperature rise rate from −50° C. to 50° C. of 3° C./min. Thereafter, the tan δ value at 15° C. was obtained.

The peak temperature of tan δ was obtained by automatic measurement using RSIOrchestrator (trade name, manufactured by TA Instruments—Waters LLC).

[Measurement of Physical Properties of Crosslinked Foam]

((1) Specific Gravity)

Each crosslinked foam was punched to form a test piece in the form of a disc having a diameter of 1.4 cm and a thickness of 1 cm, and its specific gravity was measured using an electronic gravimeter (MD-2005, manufactured by Alfa Mirage Co., Ltd.).

((2) Hardness)

The hardness (Shore C) of each crosslinked foam was measured using an Asker C durometer (CL-150 Shore C, manufactured by Kobunshi Keiki, Co., Ltd.), and momentary values were read. An average value of five points (arithmetic average) was then taken as the hardness.

((3) Permanent Compression Set)

Each crosslinked foam was adjusted to a size of 1 cm (thickness); it was compressed to 50% of its thickness in accordance with JIS-K6262, and maintained at 23° C. for 22 hours; the pressure was subsequently released, and the thickness after 30 minutes was measured to evaluate the magnitude of the residual strain.

((4) Peel Strength)

A crosslinked foam was made into a 2 cm×10 cm×1 cm (thickness) test piece, and the test piece was provided with a 2 cm cut in the center; the test piece was then placed between chucks with a distance of about 4 cm, and measurement was conducted at 100 mm/min, using a universal tensile and compression testing machine (TG-1kN, manufactured by NMB Minebea). The peel strength was calculated according to the following equation:

$$\text{Peel strength} = \text{Measurement maximum peel strength}/2 \text{ (kgf/cm)}$$

((5) Tear Strength)

A crosslinked foam was adjusted to a size of 1 cm (thickness)×an angle shape (no cut), and it was then placed between chucks with a distance of about 6 cm in accordance with JIS-K6252. Thereafter, measurement was conducted at 500 mm/min, using a universal tensile and compression testing machine (TG-5kN, manufactured by NMB Minebea). The tear strength was calculated according to the following equation:

$$\text{Tear strength} = \text{Measurement maximum tear strength (kgf/cm)}$$

((6) Tensile Strength and Tensile Elongation)

A crosslinked foam was adjusted to a size of 1 cm (thickness)×a dumbbell No. 1 shape, and it was then placed between chucks with a distance of about 6 cm in accordance with JIS-K6251. Thereafter, measurement was conducted at 500 mm/min, using a universal tensile and compression testing machine (TG-5kN, manufactured by NMB Minebea).

Tensile strength=Measurement maximum tensile
strength/Initial cross section area (kgf/cm$^2$)

Tensile elongation=Test piece elongation at break
(cm)/2cm Initial gauge length×100

((7) Impact Resilience)

A crosslinked foam was adjusted to a thickness of 1 cm, and the impact resilience was then measured in accordance with JIS-K6255; a 15 g iron ball was dropped from a height of 40 cm (=$L_0$), and the rebound height of the iron ball (=L) was measured at 23° C. The impact resilience was determined using the following equation:

Impact resilience(%)=L/$L_0$×100

((8) Adhesive Strength)

A crosslinked foam and a vulcanized rubber were each cut into a test piece with a size of 2 cm×10 cm×1 cm (thickness), and they were then prepared by the following methods. Thereafter, the adhesive strength of the crosslinked foam and that of the vulcanized rubber were measured.

<(1) Preparation of Crosslinked Foam>
1. The surface of a crosslinked foam was washed with water, and was then dried in an oven at 50° C. for 10 minutes.
2. An aqueous UV primer P-6-2 (DONGSUNG NSC LTD.) was applied to the surface, and the resultant surface was then dried in an oven at 50° C. for 2.5 minutes.
3. The surface was irradiated with UV (0.56 J/cm$^2$).
4. An aqueous adhesive WO1 (DONGSUNG NSC LTD.) was applied to the surface, and the surface was then hot-air dried at 55° C. for 1.5 minutes.

<(2) Preparation of Vulcanized Rubber>
1. The surface of a vulcanized rubber was washed with water, and was then dried in an oven at 50° C. for 30 minutes.
2. An aqueous primer PR-505 (DONGSUNG NSC LTD.) was applied to the surface, and the resultant surface was then hot-air dried at 55° C. for 1.5 minutes.
3. An aqueous adhesive WO1 (DONGSUNG NSC LTD.) was applied to the surface, and the surface was then hot-air dried at 55° C. for 1.5 minutes.

<(3) Measurement of Adhesive Strength by Adhesive Integration of Crosslinked Foam and Vulcanized Rubber>

The two substrates, the surface of each of which had been coated with an aqueous adhesive WO1 (DONGSUNG NSC LTD.), were pressed at 78.4 Pa (8 kg/cm$^2$) for 30 minutes, so that they were integrated. Thereafter, the adhesive strength was measured at 100 mm/min using a universal tensile and compression testing machine (TG-5kN, manufactured by NMB Minebea).

((9) Balance between Lightness and Peel Strength)

The ratio "peel strength/specific gravity" between the specific gravity of the foam and the peel strength thereof was calculated. It was determined that, the greater this value, a better balance could be obtained between the lightless of the foam and the peel strength thereof.

[Raw Materials Used]

The (A) olefin-based copolymers, (B) vinyl aromatic-based copolymers, (C) inorganic fillers, (D) organic silane coupling agents, (E) foaming agents, and (F) crosslinking agents, which were used in the after-mentioned Examples and Comparative Examples, are described below.

((A) Olefin-Based Copolymer)
<A1>
An ethylene-1-butene copolymer (manufactured by Mitsui Chemicals, Inc., trade name "TAFMER DF110")
Hardness (Shore A): 96
<A2>
An ethylene-1-butene copolymer (manufactured by Mitsui Chemicals, Inc., trade name "TAFMER DF810")
Hardness (Shore A): 87
<A3>
An ethylene-vinyl acetate copolymer (manufactured by Du Pont-Mitsui Polychemicals, Co., Ltd., trade name "EVAFLEX EV460")
Hardness (Shore A): 90

((B) Copolymer)
[(B-I) Vinyl Aromatic-Based Copolymer]
(Preparation of Hydrogenation Catalyst)

A hydrogenation catalyst used in the hydrogenation reaction of a vinyl aromatic-based copolymer was prepared by the following method.

Into a nitrogen-purged reactor, 1 liter of dried and purified cyclohexane was placed, and 100 mmol of bis(η5-cyclopentadienyl)titanium dichloride was then added to the reactor. Thereafter, while fully stirring, a n-hexane solution containing 200 mmol of trimethyl aluminum was added to the reactor. The obtained mixture was reacted at room temperature for approximately 3 days.

The following <B1> to <B4> were prepared as (B-I) vinyl aromatic-based copolymers.
<B1>

Using a stirrer with an internal volume of 10 liters and a jacketed tank-type reactor, a vinyl aromatic-based copolymer was prepared by the following method.

A predetermined amount of cyclohexane was placed into the reactor, and the temperature was then adjusted to 70° C. Thereafter, n-butyllithium was added to the reactor from the bottom thereof, so that the amount of the n-butyllithium could be 0.16 mass parts based on the total mass of all monomers (the total amount of a butadiene monomer and a styrene monomer supplied to the reactor). Moreover, a cyclohexane solution of N,N,N',N'-tetramethylethylenediamine was added to the reactor, so that the amount of the N,N,N',N'-tetramethylethylenediamine could be 0.35 moles based on 1 mole of the n-butyllithium. Thereafter, a cyclohexane solution containing 15 mass parts of styrene at the first step (monomer concentration: 24 mass %) was supplied as a monomer to the reactor for approximately 10 minutes, and the temperature in the reactor was then adjusted to approximately 70° C.

After stoppage of the supply, the reaction was carried out for 15 minutes, while adjusting the temperature in the reactor to 70° C.

Subsequently, a cyclohexane solution containing 70 mass parts of butadiene at the second step (monomer concentration: 24 mass %) was continuously supplied at a constant rate to the reactor over 60 minutes, and during this operation, the temperature in the reactor was adjusted to 70° C. After stoppage of the supply, the reaction was carried out for 10 minutes, while adjusting the temperature in the reactor to 70° C.

Thereafter, a cyclohexane solution containing 15 mass parts of styrene at the third step (monomer concentration: 24 mass %) was supplied to the reactor for approximately 10 minutes, and the temperature in the reactor was then adjusted to approximately 70° C. After stoppage of the supply, the reaction was carried out for 15 minutes, while adjusting the temperature in the reactor to 70° C.

After completion of the polymerization, 1,3-dimethyl-2-imidazolidinone was added as a modifier in an amount equimolar to n-butyllithium used in the polymerization, and the mixture was then allowed to react for 10 minutes, while adjusting the temperature in the reactor to 70° C. The obtained modified vinyl aromatic-based copolymer was analyzed. As a result, the styrene content was 30 mass %, the polystyrene block content was 30 mass %, the vinyl bond content in the butadiene portion was 35%, the modification percentage was 75%, the weight average molecular weight was 80,000, and the molecular weight distribution was 1.03.

Thereafter, the above-prepared hydrogenation catalyst was added, in an amount of 100 ppm of titanium atoms based on 100 mass parts of a non-hydrogenated vinyl aromatic-based copolymer, to the obtained modified vinyl aromatic-based copolymer. The mixture was stirred at a hydrogen pressure of 0.7 MPa for 30 minutes, while adjusting the temperature to 65° C., so that a hydrogenation reaction was carried out.

After completion of the reaction, 0.25 mass parts of octadecyl-3-(3,5-di-t-butyl-4-hydroxyphenyl) propionate was added as a stabilizer based on 100 mass parts of the copolymer, so as to obtain a modified vinyl aromatic-based copolymer B1. The hydrogenation percentage of the polymer B1 was 80%.

<B2>

20 mass parts of styrene was added at the first step, 60 mass parts of butadiene was added at the second step, 20 mass parts of styrene was added at the third step, and n-butyllithium was added in an amount of 0.11 mass parts based on the total mass of all monomers to a reactor from the bottom thereof. Thereafter, the amount of N,N,N',N'-tetramethylethylenediamine was changed so that it became 0.25 moles based on 1 mole of the n-butyllithium. Polymerization was carried out in the same manner as that of the above-described polymer B1, except for the aforementioned conditions. A modification reaction was not carried out.

After completion of the polymerization, a cyclohexane solution of methanol was added to the reaction product, so that the methanol could be in an amount equimolar to 1 mole of the n-butyllithium, thereby terminating the polymerization reaction.

The vinyl aromatic-based copolymer obtained as a result of the polymerization was analyzed. As a result, the styrene content was 40 mass %, the polystyrene block content was 40 mass %, the vinyl bond content in the butadiene portion was 28%, the weight average molecular weight was 75,000, and the molecular weight distribution was 1.04.

Subsequently, the obtained vinyl aromatic-based copolymer was subjected to a hydrogenation reaction as in the case of the above-described polymer B1. After completion of the reaction, a stabilizer was added to the reaction product. Thus, a vinyl aromatic-based copolymer B2 having a hydrogenation percentage of 40% was obtained.

<B3>

22.5 mass parts of styrene was added at the first step, 55 mass parts of butadiene was added at the second step, 22.5 mass parts of styrene was added at the third step, and n-butyllithium was added in an amount of 0.10 mass parts based on the total mass of all monomers to a reactor from the bottom thereof. Thereafter, the amount of N,N,N',N'-tetramethylethylenediamine was changed so that it became 0.23 moles based on 1 mole of the n-butyllithium. Polymerization was carried out in the same manner as that of the above-described polymer B1, except for the aforementioned conditions. A modification reaction was not carried out.

After completion of the polymerization, a cyclohexane solution of methanol was added to the reaction product, so that the methanol could be in an amount equimolar to 1 mole of the n-butyllithium, thereby terminating the polymerization reaction.

The vinyl aromatic-based copolymer obtained as a result of the polymerization was analyzed. As a result, the styrene content was 45 mass %, the polystyrene block content was 45 mass %, the vinyl bond content in the butadiene portion was 25%, the weight average molecular weight was 70,000, and the molecular weight distribution was 1.05.

Subsequently, the obtained vinyl aromatic-based copolymer was subjected to a hydrogenation reaction as in the case of the above-described polymer B1. After completion of the reaction, a stabilizer was added to the reaction product. Thus, a vinyl aromatic-based copolymer B3 having a hydrogenation percentage of 35% was obtained.

<B4>

From the bottom of a reactor, n-butyllithium was added to the reactor, so that the amount of the n-butyllithium became 0.07 mass parts based on the total weight of all monomers. Further, a cyclohexane solution of N,N,N',N'-tetramethylethylenediamine was added to the reactor, so that the amount of the N,N,N',N'-tetramethylethylenediamine became 0.3 moles based on 1 mole of the n-butyllithium. Thereafter, a cyclohexane solution containing 10 mass parts of styrene at the first step was supplied as a monomer to the reactor for approximately 5 minutes, and the temperature in the reactor was adjusted to approximately 70° C. After stoppage of the supply, the reaction was carried out for 15 minutes, while adjusting the temperature in the reactor to 70° C.

Subsequently, a cyclohexane solution containing 37 mass parts of butadiene and 45 mass parts of styrene at the second step was continuously supplied at a constant rate to the reactor over 60 minutes, and during this operation, the temperature in the reactor was adjusted to a temperature from 70 to 80° C. After stoppage of the supply, the mixture was allowed to react for 10 minutes, while adjusting the temperature in the reactor to a temperature from 70 to 80° C.

Finally, a cyclohexane solution containing 8 mass parts of styrene at the third step was supplied to the reactor for 5 minutes, and the temperature in the reactor was adjusted to approximately 70° C. After stoppage of the supply, the mixture was allowed to react for 15 minutes, while adjusting the temperature in the reactor to 70° C.

Polymerization was carried out in the same manner as that of the polymer B1, except for the aforementioned conditions. A modification reaction was not carried out.

After completion of the polymerization, a cyclohexane solution of methanol was added to the reaction product, so that the methanol could be in an amount equimolar to 1 mole of the n-butyllithium, thereby terminating the polymerization reaction.

The vinyl aromatic-based copolymer obtained as a result of the polymerization was analyzed. As a result, the styrene content was 62 mass %, the polystyrene block content was 23 mass %, the vinyl bond content in the butadiene portion was 21%, the weight average molecular weight was 160,000, and the molecular weight distribution was 1.08.

Subsequently, the obtained vinyl aromatic-based copolymer was subjected to a hydrogenation reaction as in the case of the above-described polymer B1. After completion of the reaction, a stabilizer was added to the reaction product. Thus, a vinyl aromatic-based copolymer B4 having a hydrogenation percentage of 35% was obtained.

The composition, structure, molecular weight and measurement results of physical properties of each of the obtained vinyl aromatic-based copolymers are shown in the following Table 1.

TABLE 1

| Composition, structure and molecular weight of polymer | B1 | B2 | B3 | B4 |
|---|---|---|---|---|
| Styrene content (mass %) in polymer | 30 | 40 | 45 | 62 |
| Styrene block content (mass %) in polymer | 30 | 40 | 45 | 23 |
| Vinyl content (%) in conjugated diene | 35 | 28 | 25 | 21 |
| Weight average molecular weight (ten thousands) | 8 | 7.5 | 7 | 16 |
| Hydrogenation percentage (%) to double bond in conjugated diene | 80 | 40 | 35 | 35 |
| Tan δ peak temperature (° C.) | −55 | −61 | −66 | 9 |
| Tan δ value at 15° C. | | 0.07 | 0.06 | 0.044 | 0.72 |

[(B-II) Ethylene-based Copolymer Having Unsaturated Group]
<B5>

Ethylene-propylene-diene copolymer EPDM (trade name "Nordel IP 4770R," manufactured by the Dow Chemical Company)

((C) Inorganic Filler)
<C1>

As an inorganic filler, silica Nipsil AQ (manufactured by Tosoh Silica Corporation, mean dispersed particle diameter: 0.3 μm) was used.

<C2>

As an inorganic filler, talc JM209 (manufactured by Asada Milling Co., Ltd., mean dispersed particle diameter: 3.5 μm) was used.

((D) Organic Silane Coupling Agent)
<D1>

As a sulfide-based organic silane coupling agent, Si69 (manufactured by Evonik Degussa Japan Co., Ltd.) was used.

<D2>

As a sulfide-based organic silane coupling agent, Si75 (manufactured by Evonik Degussa Japan Co., Ltd.) was used.

<D3>

As a vinyl-based organic silane coupling agent, GF 56 (manufactured by Wacker Asahikasei Silicone Co., Ltd.) was used.

<D4>

As a mercapto-based organic silane coupling agent, GF 70 (manufactured by Wacker Asahikasei Silicone Co., Ltd.) was used.

((E) Foaming Agent)

As a foaming agent, Excellar AK#2 (manufactured by EIWA CHEMICAL IND. CO., LTD.) was used.

((F) Crosslinking Agent)

As an organic oxide, PERCUMYL D (NOF Corporation) was used.

Example 1

First, using an extruder as a melt-kneader, 20 mass parts of the (A1) ethylene-1-butene copolymer, 10 mass parts of the (B1) vinyl aromatic-based copolymer, 5 mass parts of the (C1) inorganic filler, silica Nipsil AQ, and 0.4 mass parts of the (D2) organic silane coupling agent Si75, which were the blending components in the first step shown in Table 2 below, were kneaded at a kneading temperature of 200° C. to obtain a master pellet.

Subsequently, using a pressure kneader as a melt-kneader, the master pellet that was the kneaded product obtained in the first step, and 70 mass parts of the (A1) ethylene-1-butene copolymer and other additives, which were the blending components in the second step shown in Table 2 below, were kneaded at a kneading temperature of approximately 130° C. for a kneading time of 10 minutes.

Thereafter, using a two-roll open mill as a melt-kneader, the kneaded product obtained in the second step, and 9 mass parts of the (E) foaming agent, Excellar AK#2 and 0.7 mass parts of the (F) organic oxide, PERCUMYL D, which were the blending components in the third step shown in Table 2 below, were kneaded at a kneading temperature of 100° C. for a kneading time of 5 minutes to obtain a foamable composition.

Thereafter, using a compression molding machine, the obtained foamable composition was compression-molded at a temperature of 160° C. under a pressure of 150 kgf/cm² for 20 minutes.

After that, the pressure was released to obtain a primary crosslinked foam.

This primary crosslinked foam was compression-molded at a compression ratio of 145±5%, thereby producing a second-order crosslinked foam.

The physical properties of the second-order crosslinked foam were subsequently measured according to the methods described above.

Example 2

The (B2) vinyl aromatic-based copolymer was used, instead of the (B1) vinyl aromatic-based copolymer in the first step shown in Table 2 below. Except for this condition, a second-order crosslinked foam was prepared as in Example 1. The physical properties thereof were measured according to the methods described above.

Example 3

The (B3) vinyl aromatic-based copolymer was used, instead of the (B1) vinyl aromatic-based copolymer in the first step shown in Table 2 below. Except for this condition, a second-order crosslinked foam was prepared as in Example 1. The physical properties thereof were measured according to the methods described above.

Example 4

The (C2) inorganic filler, talc JM209 was used, instead of the (C1) inorganic filler, silica Nipsil AQ in the first step shown in Table 2 below. Except for this condition, a second-order crosslinked foam was prepared as in Example 3. The physical properties thereof were measured according to the methods described above.

Example 5

The (D3) organic silane coupling agent was used, instead of the (D2) organic silane coupling agent in the first step shown in Table 2 below. Except for this condition, a second-order crosslinked foam was prepared as in Example 3. The physical properties thereof were measured according to the methods described above.

Example 6

The (D4) organic silane coupling agent was used, instead of the (D2) organic silane coupling agent in the first step shown in Table 2 below. Except for this condition, a second-order crosslinked foam was prepared as in Example 3. The physical properties thereof were measured according to the methods described above.

Example 7

The (B5) ethylene-based copolymer containing an unsaturated group was used, instead of the (B1) vinyl aromatic-based copolymer in the first step shown in Table 2 below. Except for this condition, a second-order crosslinked foam was prepared as in Example 1. The physical properties thereof were measured according to the methods described above.

Example 8

20 mass parts of the (A1) ethylene-1-butene copolymer, 20 mass parts of the (A2) ethylene-1-butene copolymer, 5 mass parts of the (C1) inorganic filler, silica Nipsil AQ, and 0.4 mass parts of the (D3) organic silane coupling agent GF 56 were used as blending components of the materials in the first step shown in Table 2 below. Moreover, 60 mass parts of the (A1) ethylene-1-butene copolymer was used as a blending component of the materials in the second step. Except for these conditions, a second-order crosslinked foam was prepared as in Example 1. The physical properties thereof were measured according to the methods described above.

Example 9

0.5 mass parts of the (D1) organic silane coupling agent was used, instead of the (D2) organic silane coupling agent, as a blending component of the materials in the first step shown in Table 2 below. 50 mass parts of the (A3) ethylene-vinyl acetate copolymer and 20 mass parts of the (A1) ethylene-1-butene copolymer were used in the second step. 7 mass parts of the (E) foaming agent, Excellar AK#2 was used as a blending component in the third step. Except for these conditions, a second-order crosslinked foam was prepared as in Example 3. The physical properties thereof were measured according to the methods described above.

Example 10

20 mass parts of the (A1) ethylene-1-butene copolymer, 20 mass parts of the (A2) ethylene-1-butene copolymer, 5 mass parts of the (C1) inorganic filler, silica Nipsil AQ, and 0.4 mass parts of the (D1) organic silane coupling agent Si69 were used as blending components in the first step shown in Table 2 below. 60 mass parts of the (A1) ethylene-1-butene copolymer was used as a blending component in the second step. 7 mass parts of the (E) foaming agent, Excellar AK#2 and 0.7 mass parts of the (F) organic oxide, PERCUMYL D were used as blending components in the third step. Except for these conditions, a second-order crosslinked foam was prepared as in Example 1. The physical properties thereof were measured according to the methods described above.

Comparative Example 1

The (C1) inorganic filler and the (D2) organic silane coupling agent, which were the additives in the first step shown in Table 3 below, were not blended. Except for this condition, a second-order crosslinked foam was prepared as in Example 3. The physical properties thereof were measured according to the methods described above.

Comparative Example 2

The (D2) organic silane coupling agent, which was the additive in the first step shown in Table 3 below, was not blended. Except for this condition, a second-order crosslinked foam was prepared as in Example 3. The physical properties thereof were measured according to the methods described above.

Comparative Example 3

The (C1) inorganic filler, which was the additive in the first step shown in Table 3 below, was not blended. Except for this condition, a second-order crosslinked foam was prepared as in Example 3. The physical properties thereof were measured according to the methods described above.

Comparative Example 4

The (D2) organic silane coupling agent, which was the additive in the first step shown in Table 3 below, was not blended. Except for this condition, a second-order crosslinked foam was prepared as in Example 4. The physical properties thereof were measured according to the methods described above.

Comparative Example 5

The (C1) inorganic filler and the (D2) organic silane coupling agent, which were the additives in the first step shown in Table 3 below, were not blended. Except for this condition, a second-order crosslinked foam was prepared as in Example 5. The physical properties thereof were measured according to the methods described above.

Comparative Example 6

The (A1) ethylene-based copolymer in the first step shown in Table 3 below, was not blended, and the amount of the (E) foaming agent, Excellar AK#2 was changed from 9 mass parts to 7 mass parts. Except for these conditions, a second-order crosslinked foam was prepared as in Example 3. The physical properties thereof were measured according to the methods described above.

Example 11

First, using an extruder as a melt-kneader, 20 mass parts of the (A2) ethylene-1-butene copolymer, 60 mass parts of the (B4) vinyl aromatic-based copolymer, 10 mass parts of the (C1) inorganic filler, silica Nipsil AQ, and 0.8 mass parts of the (D2) organic silane coupling agent Si75, which were the blending components in the first step shown in Table 4 below, were kneaded at a kneading temperature of 200° C. to obtain a master pellet.

Subsequently, using a pressure kneader as a melt-kneader, the master pellet that was the kneaded product obtained in the first step, and 20 mass parts of the (A2) ethylene-1-butene copolymer and other additives, which were the blending components in the second step shown in Table 4 below, were kneaded at a kneading temperature of 130° C. for a kneading time of 10 minutes.

Thereafter, using a two-roll open mill as a melt-kneader, the kneaded product obtained in the second step, and 2 mass parts of the (E) foaming agent, Excellar AK#2 and 0.35 mass parts of the (F) organic oxide, PERCUMYL D, which were the blending components in the third step shown in Table 4 below, were kneaded at a kneading temperature of 100° C. for a kneading time of 5 minutes to obtain a foamable composition.

Thereafter, using a compression molding machine, the obtained foamable composition was compression-molded at a temperature of 160° C. under a pressure of 150 kgf/cm² for 20 minutes.

After that, the pressure was released to obtain a primary crosslinked foam. This primary crosslinked foam was compression-molded at a compression percentage of 145±5% to obtain a second-order crosslinked foam.

Subsequently, the physical properties of the second-order crosslinked foam were measured according to the methods described above.

Example 12

In the first step shown in Table 4 below, the amount of the (B4) vinyl aromatic-based copolymer was changed from 60 mass parts to 70 mass parts; in the second step, the amount of the (A2) ethylene-1-butene copolymer was changed from 20 mass parts to 10 mass parts; and further, in the third step, the amount of the (E) foaming agent, Excellar AK#2 was changed from 2 mass parts to 2.5 mass parts, and the amount of the (F) organic oxide, PERCUMYL D was changed from 0.35 mass parts to 0.44 mass parts. Except for this condition, a second-order crosslinked foam was prepared as in Example 1. The physical properties thereof were measured according to the methods described above.

Comparative Example 7

The (C1) inorganic filler and the (D2) organic silane coupling agent, which were the additives in the first step shown in Table 4 below, were not blended. Except for this condition, a second-order crosslinked foam was prepared as in Example 11. The physical properties thereof were measured according to the methods described above.

Table 2 below shows the results obtained in Examples 1 to 10; Table 3 below shows the results obtained in Comparative Examples 1 to 6; and Table 4 below shows the results obtained in Examples 11 and 12 and Comparative Example 7, respectively.

TABLE 2

| | | Blending component | Example 1 | Example 2 | Example 3 | Example 4 | Example 5 |
|---|---|---|---|---|---|---|---|
| First step Extruder 200° C. | | Ethylene-1-butene copolymer (A1) | 20 | 20 | 20 | 20 | 20 |
| | | Ethylene-1-butene copolymer (A2) | | | | | |
| | | Vinyl aromatic-based copolymer (B1) | 10 | | | | |
| | | Vinyl aromatic-based copolymer (B2) | | 10 | | | |
| | | Vinyl aromatic-based copolymer (B3) | | | 10 | 10 | 10 |
| | | Ethylene-based copolymer containing unsaturated group (B5) | | | | | |
| | Additive | Inorganic filler (C1) | 5 | 5 | 5 | | 5 |
| | | Inorganic filler (C2) | | | | 5 | |
| | | Organic silane coupling agent (D1) | | | | | |
| | | Organic silane coupling agent (D2) | 0.4 | 0.4 | 0.4 | 0.4 | |
| | | Organic silane coupling agent (D3) | | | | | 0.4 |
| | | Organic silane coupling agent (D4) | | | | | |
| Second step Kneader 130° C. | | Ethylene-1-butene copolymer (A1) | 70 | 70 | 70 | 70 | 70 |
| | | Ethylene-vinyl acetate copolymer (A3) | | | | | |
| | Additive | Zinc oxide | 1.2 | 1.2 | 1.2 | 1.2 | 1.2 |
| | | Stearic acid | 0.4 | 0.4 | 0.4 | 0.4 | 0.4 |
| | | Titanium oxide | 2.0 | 2.0 | 2.0 | 2.0 | 2.0 |
| | | Zinc stearate | 0.8 | 0.8 | 0.8 | 0.8 | 0.8 |
| Third step Roll 100° C. | Additive | Foaming agent (E) | 9.0 | 9.0 | 9.0 | 9.0 | 9.0 |
| | | Crosslinking agent (F) | 0.7 | 0.7 | 0.7 | 0.7 | 0.7 |
| Specific gravity | | Primary crosslinked foam (g/cc) | 0.075 | 0.079 | 0.082 | 0.077 | 0.080 |
| Specific gravity | | Second-order crosslinked foam (g/cc) | 0.109 | 0.112 | 0.113 | 0.097 | 0.111 |
| Hardness | | Momentary value (Shore C) | 50 | 54 | 57 | 51 | 55 |
| Tensile strength | | (kgf/cm²) | 42 | 46 | 50 | 45 | 51 |
| Elongation | | (%) | 240 | 230 | 210 | 230 | 220 |
| Tear strength | | (kgf/cm) | 10 | 12 | 11 | 10 | 11 |
| Peel strength | | (kgf/cm) | 2.5 | 2.4 | 2.7 | 2 | 2.3 |
| Permanent compression set | | (%) | 14 | 15 | 16 | 23 | 19 |
| Impact resilience | | (%) | 50 | 48 | 46 | 48 | 46 |
| Adhesive strength 30 minutes | | (kgf/cm) | 2.9 | 2.8 | 2.7 | 2.5 | 2.8 |
| Peel/Specific gravity (kgf · cc/g · cm) | | | 22.9 | 21.4 | 23.9 | 20.6 | 20.7 |

| | | Blending component | Example 6 | Example 7 | Example 8 | Example 9 | Example 10 |
|---|---|---|---|---|---|---|---|
| First step Extruder 200° C. | | Ethylene-1-butene copolymer (A1) | 20 | 20 | 20 | 20 | 20 |
| | | Ethylene-1-butene copolymer (A2) | | | 20 | | 20 |
| | | Vinyl aromatic-based copolymer (B1) | | | | | |
| | | Vinyl aromatic-based copolymer (B2) | | | | | |
| | | Vinyl aromatic-based copolymer (B3) | 10 | | | 10 | |
| | | Ethylene-based copolymer containing unsaturated group (B5) | | 10 | | | |
| | Additive | Inorganic filler (C1) | 5 | 5 | 5 | 5 | 5 |
| | | Inorganic filler (C2) | | | | | |

TABLE 2-continued

|  |  |  |  |  |  |  |  |
|---|---|---|---|---|---|---|---|
|  |  | Organic silane coupling agent (D1) |  |  |  | 0.5 | 0.5 |
|  |  | Organic silane coupling agent (D2) |  | 0.4 |  |  |  |
|  |  | Organic silane coupling agent (D3) |  |  | 0.4 |  |  |
|  |  | Organic silane coupling agent (D4) | 0.4 |  |  |  |  |
| Second step | | Ethylene-1-butene copolymer (A1) | 70 | 70 | 60 | 20 | 60 |
| Kneader 130° C. | | Ethylene-vinyl acetate copolymer (A3) |  |  |  | 50 |  |
|  | Additive | Zinc oxide | 1.2 | 1.2 | 1.2 | 1.2 | 1.2 |
|  |  | Stearic acid | 0.4 | 0.4 | 0.4 | 0.4 | 0.4 |
|  |  | Titanium oxide | 2.0 | 2.0 | 2.0 | 2.0 | 2.0 |
|  |  | Zinc stearate | 0.8 | 0.8 | 0.8 | 0.8 | 0.8 |
| Third step | Additive | Foaming agent (E) | 9.0 | 9.0 | 9.0 | 7.0 | 7.0 |
| Roll 100° C. |  | Crosslinking agent (F) | 0.7 | 0.7 | 0.7 | 0.7 | 0.7 |
| Specific gravity |  | Primary crosslinked foam (g/cc) | 0.075 | 0.073 | 0.074 | 0.110 | 0.101 |
| Specific gravity |  | Second-order crosslinked foam (g/cc) | 0.102 | 0.096 | 0.103 | 0.149 | 0.142 |
| Hardness |  | Momentary value (Shore C) | 52 | 50 | 51 | 55 | 53 |
| Tensile strength |  | (kgf/cm²) | 47 | 41 | 43 | 59 | 55 |
| Elongation |  | (%) | 240 | 250 | 200 | 230 | 220 |
| Tear strength |  | (kgf/cm) | 10 | 9 | 9 | 13 | 11 |
| Peel strength |  | (kgf/cm) | 2.1 | 2 | 2.1 | 3.2 | 3 |
| Permanent compression set |  | (%) | 24 | 18 | 25 | 13 | 24 |
| Impact resilience |  | (%) | 47 | 43 | 42 | 44 | 43 |
| Adhesive strength 30 minutes |  | (kgf/cm) | 2.7 | 2.6 | 2.8 | 3.2 | 2.9 |
| Peel/Specific gravity (kgf · cc/g · cm) |  |  | 20.6 | 20.8 | 20.4 | 21.5 | 21.1 |

TABLE 3

|  |  |  | Comparative Example | | | | | |
|---|---|---|---|---|---|---|---|---|
|  | Blending component |  | 1 | 2 | 3 | 4 | 5 | 6 |
| First step | Ethylene-1-butene copolymer (A1) |  | 20 | 20 | 20 | 20 | 20 |  |
| Extruder 200° C. | Ethylene-1-butene copolymer (A2) |  |  |  |  |  | 20 |  |
|  | Vinyl aromatic-based copolymer (B1) |  |  |  |  |  |  |  |
|  | Vinyl aromatic-based copolymer (B2) |  |  |  |  |  |  | 100 |
|  | Vinyl aromatic-based copolymer (B3) |  | 10 | 10 | 10 | 10 |  |  |
|  | Ethylene-based copolymer containing unsaturated group (B5) |  |  |  |  |  |  |  |
|  | Additive | Inorganic filler (C1) |  | 5 |  | 5 |  | 5 |
|  |  | Inorganic filler (C2) |  |  |  |  |  |  |
|  |  | Organic silane coupling agent (D1) |  |  |  |  |  |  |
|  |  | Organic silane coupling agent (D2) |  |  | 0.4 |  |  | 0.4 |
|  |  | Organic silane coupling agent (D3) |  |  |  |  |  |  |
|  |  | Organic silane coupling agent (D4) |  |  |  |  |  |  |
| Second step | Ethylene-1-butene copolymer (A1) |  | 70 | 70 | 70 | 20 | 60 |  |
| Kneader 130° C. | Ethylene-vinyl acetate copolymer (A3) |  |  |  |  | 50 |  |  |
|  | Additive | Zinc oxide | 1.2 | 1.2 | 1.2 | 1.2 | 1.2 | 1.2 |
|  |  | Stearic acid | 0.4 | 0.4 | 0.4 | 0.4 | 0.4 | 0.4 |
|  |  | Titanium oxide | 2.0 | 2.0 | 2.0 | 2.0 | 2.0 | 2.0 |
|  |  | Zinc stearate | 0.8 | 0.8 | 0.8 | 0.8 | 0.8 | 0.8 |
| Third step | Additive | Foaming agent (E) | 9.0 | 9.0 | 9.0 | 7.0 | 7.0 | 7.0 |
| Roll 100° C. |  | Crosslinking agent (F) | 0.7 | 0.7 | 0.7 | 0.7 | 0.7 | 0.7 |
| Specific gravity |  | Primary crosslinked foam (g/cc) | 0.073 | 0.077 | 0.074 | 0.105 | 0.090 | Poorly molded unmeasurable |
| Specific gravity |  | Second-order crosslinked foam (g/cc) | 0.106 | 0.112 | 0.108 | 0.14 | 0.129 |  |
| Hardness |  | Momentary value (Shore C) | 40 | 51 | 47 | 52 | 40 |  |
| Tensile strength |  | (kgf/cm²) | 36 | 45 | 45 | 49 | 47 |  |
| Elongation |  | (%) | 240 | 160 | 200 | 160 | 230 |  |
| Tear strength |  | (kgf/cm) | 8 | 6 | 7 | 9 | 9 |  |
| Peel strength |  | (kgf/cm) | 1.7 | 1.6 | 1.9 | 2.5 | 2.1 |  |
| Permanent compression set |  | (%) | 36 | 37 | 30 | 27 | 32 |  |
| Impact resilience |  | (%) | 46 | 45 | 46 | 46 | 42 |  |
| Adhesive strength 30 minutes later |  | (kgf/cm) | 1.6 | 1.8 | 2 | 2.1 | 1.9 |  |
| Peel/Specific gravity (kgf · cc/g · cm) |  |  | 16.0 | 14.3 | 17.6 | 17.9 | 16.3 |  |

TABLE 4

|  |  | Example | | Comparative |
|---|---|---|---|---|
|  | Blending component | 11 | 12 | Example 7 |
| First step | Ethylene-1-butene copolymer (A2) | 20 | 20 | 20 |
| Extruder 200° C. | Vinyl aromatic-based copolymer (B4) | 60 | 70 | 60 |
|  | Additive  Inorganic filler (C1) | 10 | 10 |  |
|  | Organic silane coupling agent (D2) | 0.8 | 0.8 |  |

TABLE 4-continued

|  | Blending component |  | Example 11 | Example 12 | Comparative Example 7 |
|---|---|---|---|---|---|
| Second step | Ethylene-1-butene copolymer (A1) |  |  | 10 |  |
| Kneader 130° C. | Ethylene-1-butene copolymer (A2) |  | 20 |  | 20 |
|  | Additive | Zinc oxide | 1.12 | 1.12 | 1.12 |
|  |  | Stearic acid | 0.32 | 0.32 | 0.32 |
|  |  | Titanium oxide | 2.00 | 2.00 | 2.00 |
|  |  | Zinc stearate | 0.64 | 0.64 | 0.64 |
| Third step | Additive | Foaming agent (E) | 2.00 | 2.50 | 2.00 |
| Roll 100° C. |  | Crosslinking agent (F) | 0.35 | 0.44 | 0.35 |
| Specific gravity | Primary crosslinked foam (g/cc) |  | 0.30 | 0.22 | 0.27 |
| Specific gravity | Second-order crosslinked foam (g/cc) |  | 0.43 | 0.32 | 0.41 |
| Hardness | Momentary value |  | 54 | 52 | 47 |
| Peel strength | (kgf/cm) |  | 3.9 | 3.3 | 2.2 |
| Permanent compression set | (%) |  | 13 | 15 | 31 |
| Impact resilience | (%) |  | 13 | 11 | 13 |
| Adhesive strength 30 minutes later | (kgf/cm) |  | 3.3 | 3 | 1.5 |

The specific gravities of the second-order crosslinked foams of Examples 1 to 8 and Comparative Examples 1 to 3 were substantially equal to one another.

The second-order crosslinked foam of Examples 1 to 8 had a hardness of 50 to 57, a permanent compression set of 14 to 25%, a peel strength of 2.0 to 2.7 kgf/cm, and an adhesive strength of 2.5 to 2.9 kgf/cm.

On the other hand, all of the second-order crosslinked foams of Comparative Examples 1 to 3 had a hardness of 40 to 51, a permanent compression set of 30 to 37%, a peel strength of 1.6 to 1.9 kgf/cm, and an adhesive strength of 1.6 to 2.0 kgf/cm, and thus, the results of Comparative Examples 1 to 3 were poorer than those of the Example.

The specific gravities of the second-order crosslinked foams of Example 9 and Comparative Example 4 were substantially equal to one another.

The second-order crosslinked foam of Example 9 had a hardness of 55, a permanent compression set of 13%, a peel strength of 3.2 kgf/cm, and an adhesive strength of 3.2 kgf/cm.

On the other hand, the second-order crosslinked foam of Comparative Example 4 had a hardness of 52, a permanent compression set of 27%, a peel strength of 2.5 kgf/cm, and an adhesive strength of 2.1 kgf/cm, and thus, the results of Comparative Example 4 were poorer than those of the Example.

The specific gravities of the second-order crosslinked foams of Example 10 and Comparative Example 5 were substantially equal to one another.

The second-order crosslinked foam of Example 10 had a hardness of 53, a permanent compression set of 24%, a peel strength of 3.0 kgf/cm, and an adhesive strength of 2.9 kgf/cm.

On the other hand, the second-order crosslinked foam of Comparative Example 5 had a hardness of 40, a permanent compression set of 32%, a peel strength of 2.5 kgf/cm, and an adhesive strength of 1.9 kgf/cm, and thus, the results of Comparative Example 5 were poorer than those of the Example.

In addition, a foam whose physical properties were measurable could not be obtained in Comparative Example 6.

The specific gravities of the second-order crosslinked foams of Examples 11 and 12 and Comparative Example 7 were substantially equal to one another.

The second-order crosslinked foams of Examples 11 and 12 had a hardness of 52 to 54, a permanent compression set of 13 to 15%, a peel strength of 3.3 to 3.9 kgf/cm, and an adhesive strength of 3.0 to 3.3 kgf/cm.

On the other hand, the second-order crosslinked foam of Comparative Example 7 had a hardness of 47, a permanent compression set of 31%, a peel strength of 2.2 kgf/cm, and an adhesive strength of 1.5 kgf/cm, and thus, the results of Comparative Example 7 were poorer than those of the Examples.

The Examples revealed that the foamable composition of the present embodiment is lightweight and has also excellent permanent compression set, peel strength, and adhesive strength.

INDUSTRIAL APPLICABILITY

The foams of the present invention have industrial applicability as various molded articles such as automobile member, civil engineering and construction applications, household appliance parts, sporting goods, sundries, and stationery.

What is claimed is:
1. A foam obtained by foaming a composition comprising:
    (A) an olefin-based copolymer;
    (B-I) a hydrogenated vinyl aromatic-based block copolymer comprising (i) a conjugated diene monomer unit and (ii) a polymer block mainly containing at least one vinyl aromatic compound, wherein
    the amount of the conjugated diene monomer unit is from 14 to 50 mass % of the hydrogenated vinyl aromatic-based block copolymer by being hydrogenated after copolymerization, and
    the amount of the polymer block mainly containing at least one vinyl aromatic compound in the component (B-I) is from 37 mass % to 100 mass % of the total amount of the vinyl aromatic monomer units in the component (B-I);
    (C) an inorganic filler;
    (D) an organic silane coupling agent;
    (E) a foaming agent; and
    (F) a crosslinking agent,
wherein
    a mass ratio of the component (A) to the component (B-I), (A/B-I), is from 5/95 to 98/2;
    an amount of the component (C) is from 0.5 to 35 mass parts, and an amount of the component (E) is from 0.1 to 20 mass parts, based on 100 mass parts of a total amount of the components (A) and (B-I);

an amount of the component (D) is from 0.1 to 50 mass parts, based on 100 mass parts of the component (C); and the foam has a specific gravity that is 0.102 or more and 0.149 or less.

2. The foam according to claim 1, wherein the component (A) is an ethylene-based copolymer.

3. The foam according to claim 1, wherein the component (B-I) is a copolymer having a functional group in a molecular chain thereof.

4. The foam according to claim 1, wherein the component (C) has a mean dispersed particle diameter from 0.01 to 4 µm.

5. The foam according to claim 1, wherein the component (D) is an organic silane coupling agent having a group exhibiting affinity for or binding ability to the component (A) and/or the component (B-I), and further a surface of the component (C).

6. The foam according to claim 1, wherein the component (D) is a polysulfide silane coupling agent.

7. The foam according to claim 1, wherein the vinyl aromatic-based copolymer of the component (B-I) has a tan δ peak within a range of more than 0° C. and 30° C. or less and a tan δ value at 15° C. of 0.4 or more, as determined by dynamic viscoelasticity measurement (1 Hz).

8. The foam according to claim 1, wherein the vinyl aromatic-based copolymer of the component (B-I) has a tan δ peak of 0° C. or less, as determined by dynamic viscoelasticity measurement (1 Hz).

9. The foam according to claim 1, further comprising from 0.1 to 20 mass parts of (F) the crosslinking agent, based on 100 mass parts of the total amount of the components (A) and (B-I).

10. A process for producing the foam of claim 1 comprising the steps of:
(1) producing the composition comprising
previously melt-kneading, at a first stage, at least
(B-I) a vinyl aromatic-based block copolymer comprising a vinyl aromatic monomer unit and a conjugated diene monomer unit,
(C) an inorganic filler, and
(D) an organic silane coupling agent,
at a temperature of 120° C. or more to obtain a master batch; and
melt-kneading, at a second stage, the master batch, (A) an olefin-based copolymer, (E) a foaming agent, and/or (F) a crosslinking agent, and
(2) foaming the composition to produce the foam.

11. A process for producing the foam of claim 1 comprising the steps of:
(1) producing the composition comprising
previously melt-kneading, at a first stage, at least
(A) an olefin-based copolymer,
(B-I) a vinyl aromatic-based block copolymer comprising a vinyl aromatic monomer unit and a conjugated diene monomer unit,
(C) an inorganic filler, and
(D) an organic silane coupling agent,
at a temperature of 120° C. or more to obtain a master batch; and
melt-kneading, at a second stage, the master batch, (E) a foaming agent, and as required, (F) a crosslinking agent, and
(2) foaming the composition to produce the foam.

12. The foam according to claim 1, wherein the foam has a hardness (Shore C) from 15 to 70.

13. The foam according to claim 1, which has a hardness (Shore C) from 45 to 60, and a value of peel strength/specific gravity of 18 or more.

14. A footwear comprising the foam according to claim 1 or 12.

15. A building material comprising the foam according to claim 1 or 12.

16. An automobile member comprising the foam according to claim 1 or 12.

17. The foam according to claim 1, further comprising (B-II) an ethylene-based copolymer having an unsaturated group.

18. The foam according to claim 17, wherein a mass ratio of the component (B-I) to the component (B-II), (B-I/B-II), is 60/40 or more.

19. The foam according to claim 1, further comprising a second vinyl aromatic-based block copolymer comprising a vinyl aromatic monomer unit and an alkylene monomer unit.

20. The foam according to claim 1, wherein the plurality of polymer blocks comprise styrene.

21. The foam according to claim 1, wherein the component (A) is selected from the group consisting of
an ethylene-vinyl acetate copolymer;
a copolymer of three or more compounds that is obtained from ethylene and two or more compounds other than ethylene; and
an ethylene-α-olefin copolymer of ethylene and α-olefin containing 4 to 10 carbon atoms.

22. The foam according to claim 1, wherein the component (B-I) comprises from 5 to 62 mass % of the vinyl aromatic monomer unit.

23. The foam according to claim 1, wherein the composition excludes silica.

24. The foam according to claim 1, wherein the component (B-I) comprises a plurality of polymer blocks each consisting of vinyl aromatic monomer units.

25. The foam according to claim 1, wherein the component (A) is ethylene-1-butene copolymer.

26. The foam according to claim 1, wherein the component (B-I) excludes a functional group.

27. The foam according to claim 1, wherein the foaming agent is a thermally decomposable foaming agent.

28. The foam according to claim 1, wherein the inorganic filler comprises at least one filler selected from the group consisting of talc, calcium carbonate, calcium silicate, hydrotalcite, kaoline, diatomaceous earth, graphite, calcium carbonate, magnesium carbonate, magnesium hydroxide, aluminum hydroxide, calcium sulfate, barium sulfate, magnesium oxide, zinc oxide, and titanium oxide.

* * * * *